US009612869B2

(12) United States Patent
Nagasawa et al.

(10) Patent No.: US 9,612,869 B2
(45) Date of Patent: Apr. 4, 2017

(54) METHOD AND APPARATUS FOR CONTROLLING JOB SCHEDULE

(71) Applicant: FUJITSU LIMITED, Kawasaki-shi, Kanagawa (JP)

(72) Inventors: Shinji Nagasawa, Kawasaki (JP); Yuta Kojima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/473,480

(22) Filed: Aug. 29, 2014

(65) Prior Publication Data

US 2015/0067688 A1  Mar. 5, 2015

(30) Foreign Application Priority Data

Aug. 30, 2013  (JP) ................... 2013-178785

(51) Int. Cl.
*G06F 9/46* (2006.01)
*G06F 9/48* (2006.01)
(52) U.S. Cl.
CPC .................. *G06F 9/4881* (2013.01)
(58) Field of Classification Search
CPC .................................... G06F 9/4843
USPC ........................................ 718/102
See application file for complete search history.

(56) References Cited

U.S. PATENT DOCUMENTS 6,615,316 B1 * 9/2003 McKenney ........... G06F 9/5033
718/102
6,889,243 B1 * 5/2005 Hondou ................ G06F 9/4881
718/102
7,562,026 B2 * 7/2009 DelMonego ........... G06Q 10/06
705/2
7,647,591 B1 * 1/2010 Loucks ................. G06F 9/4831
718/103
7,821,656 B2 * 10/2010 Ito ......................... G06F 3/1204
718/105

(Continued)

FOREIGN PATENT DOCUMENTS

JP    11-085540    3/1999
JP    11-161504    6/1999

(Continued)

OTHER PUBLICATIONS

Honkomp et al. "A framework for schedule evaluation with processing uncertainty", Jul. 1998, ELSEVIER.*

(Continued)

*Primary Examiner* — Anna Deng
*Assistant Examiner* — Junchun Wu
(74) *Attorney, Agent, or Firm* — Fujitsu Patent Center

(57) ABSTRACT

A controller apparatus obtains job history information including execution records of one or more jobs not registered in a scheduler. Based on the job history information, the controller apparatus then estimates resource usage during execution time periods initially scheduled for jobs registered in the scheduler. This resource usage includes that of at least one of the jobs not registered in the scheduler which is to be executed together with the registered jobs on an information processing apparatus. When the estimated resource usage satisfies predetermined conditions, the controller apparatus schedules jobs including the registered jobs and the at least one of the non-registered jobs.

9 Claims, 24 Drawing Sheets

(56) References Cited

U.S. PATENT DOCUMENTS

| | | | |
|---|---|---|---|
| 8,997,107 B2* | 3/2015 | Jain | G06F 9/46 718/104 |
| 9,342,355 B2* | 5/2016 | Lin | G06F 9/4881 |
| 2003/0018952 A1* | 1/2003 | Roetzheim | G06F 8/20 717/101 |
| 2003/0191681 A1* | 10/2003 | Gallion | G06Q 10/06311 705/7.15 |
| 2005/0268299 A1* | 12/2005 | Picinich et al. | 718/100 |
| 2006/0150188 A1* | 7/2006 | Roman | G06F 9/4887 718/104 |
| 2006/0218558 A1* | 9/2006 | Torii et al. | 718/107 |
| 2007/0044099 A1* | 2/2007 | Rajput | 718/102 |
| 2009/0249340 A1* | 10/2009 | Akiyama | G06Q 10/10 718/100 |
| 2010/0251241 A1* | 9/2010 | Cardelli | G06F 9/4887 718/100 |
| 2012/0060164 A1* | 3/2012 | Jiang et al. | 718/103 |
| 2012/0110582 A1* | 5/2012 | Ferdous et al. | 718/101 |
| 2013/0042251 A1* | 2/2013 | Nader | 718/103 |
| 2013/0097606 A1* | 4/2013 | Coombe | G06F 9/4887 718/102 |
| 2014/0229221 A1* | 8/2014 | Shih et al. | 705/7.23 |
| 2014/0288987 A1* | 9/2014 | Liu | G06Q 10/06 705/7.15 |

FOREIGN PATENT DOCUMENTS

| | | |
|---|---|---|
| JP | 2005-011023 | 1/2005 |
| JP | 2006-268507 | 10/2006 |
| JP | 2010-186347 | 8/2010 |
| JP | 2010-198184 | 9/2010 |
| JP | 2012-133724 | 7/2012 |

OTHER PUBLICATIONS

Wolf et al. "SODA: An Optimizing Scheduler for Large-Scale Stream-Based Distributed Computer Systems", 2008, IFIP, pp. 306-325.*

Smith, "Reactive Scheduling Systems", 1995, Kluwer Academic Publishers.*

Lee et al. "Rescheduling for reliable job completion with the support of clouds", 2010, ELSEVIER.*

* cited by examiner

FIG. 8

RESOURCE INFORMATION TABLE  111

| TIME | TOTAL CPU USAGE | PROCESS | PRIORITY | CPU USAGE | FILE USED |
|---|---|---|---|---|---|
| 2012/11/12 18:11:00 | 90 % | proc3.exe | 9 | 25 % | /data/sales |
| | | procA.exe | 4 | 20 % | - |
| | | ⋮ | ⋮ | ⋮ | ⋮ |
| 2012/11/12 18:12:00 | 80 % | proc3.exe | 9 | 20 % | - |
| | | procA.exe | 4 | 15 % | /tmp/log |
| | | ⋮ | ⋮ | ⋮ | ⋮ |

FIG. 9

MANAGED JOB TABLE         112

| | JOB NAME | ONLINE BATCH |
|---|---|---|
| 1 | START PATTERN | DAILY |
| | SCHEDULED START TIME | 18:00 |
| | EXPECTED DURATION | 30 minutes |
| | PROCESS | /run/proc3.exe |
| | PRIORITY | 9 |
| ⋮ | ⋮ | ⋮ |

FIG. 10

VIRTUAL JOB TABLE 113

| | | |
|---|---|---|
| 1 | JOB NAME | VIRTUAL_JOB_procA.exe |
| | START PATTERN | EVERY MONDAY |
| | EXPECTED START TIME | 18:10 |
| | EXPECTED DURATION | 20 minutes |
| | PROCESS | procA.exe |
| | PRIORITY | 4 |
| | CPU USAGE | 10,20,15,10,...,10,5,5,5 |
| | FILE USED | /tmp/log |
| | FILE ACCESS | 0,0,1,1,...,1,0,0,0 |
| ⋮ | ⋮ | ⋮ |

FIG. 11

SUSPEND JOB TABLE                            114

| PROCESS | SUSPEND TIME | SCHEDULED RELEASE TIME |
|---------|--------------|------------------------|
| procA.exe | 2012/12/1 18:10 | 2012/12/1 18:15 |
| ⋮ | ⋮ | ⋮ |

FIG. 16
(A) ORIGINAL SCHEDULE
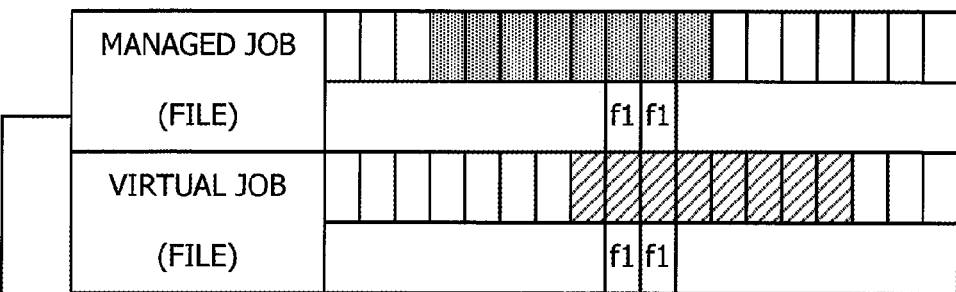
(B) POSSIBLE TO ADVANCE
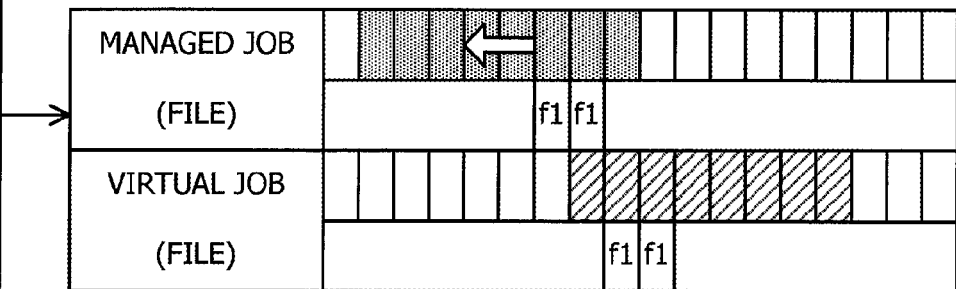
(C) MANAGED JOB>VIRTUAL JOB
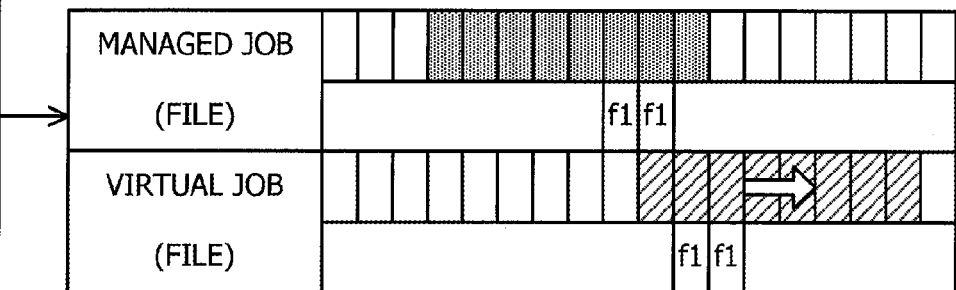
(D) MANAGED JOB≦VIRTUAL JOB
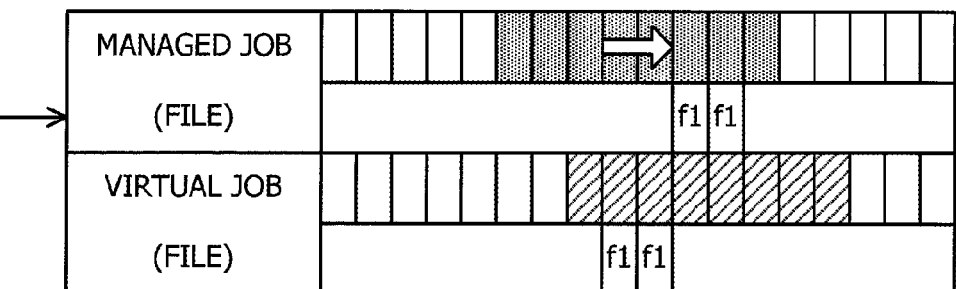

FIG. 19
(A) ORIGINAL SCHEDULE
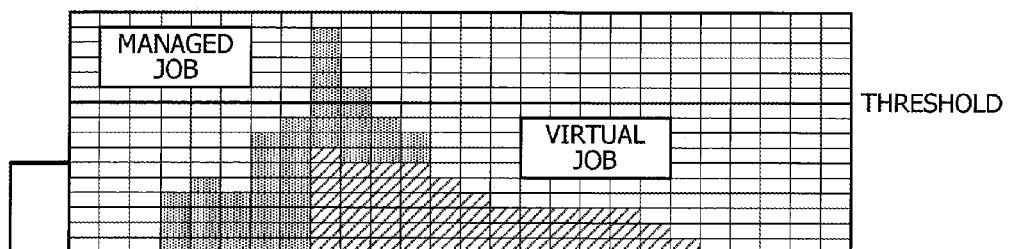
THRESHOLD
(B) POSSIBLE TO ADVANCE
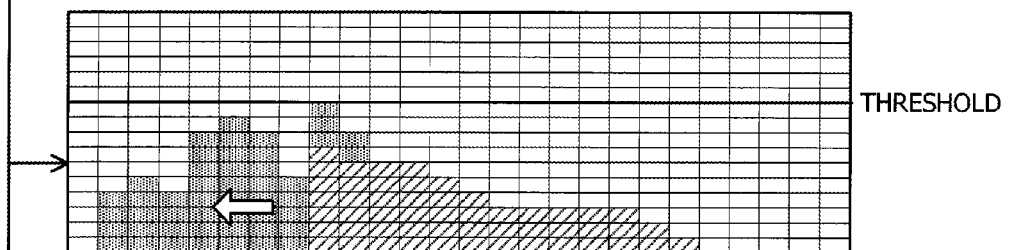
THRESHOLD
(C) MANAGED JOB>VIRTUAL JOB
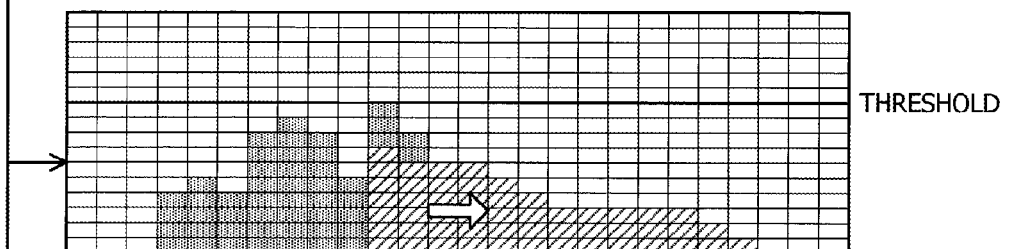
THRESHOLD
(D) MANAGED JOB≦VIRTUAL JOB
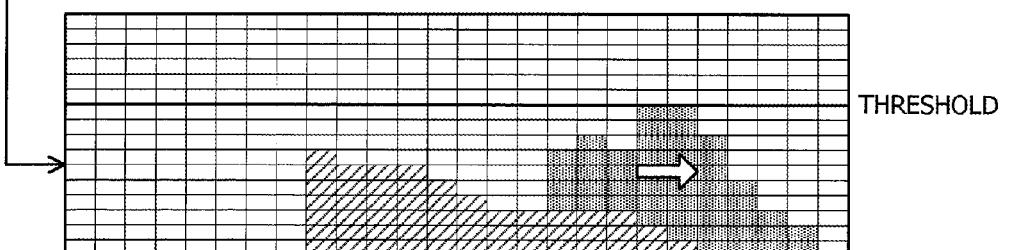
THRESHOLD

METHOD AND APPARATUS FOR CONTROLLING JOB SCHEDULE

CROSS-REFERENCE TO RELATED APPLICATION

This application is based upon and claims the benefit of priority of the prior Japanese Patent Application No. 2013-178785, filed on Aug. 30, 2013, the entire contents of which are incorporated herein by reference.

FIELD

The embodiments discussed herein relate to a method and apparatus for controlling job schedule.

BACKGROUND

Business activities include repetitive routine operations, many of which are coded as computer jobs for automated execution. For example, a computer system is used to manage servers and other electronic devices, with various operations such as bootup and shutdown, data collection and analysis, and maintenance of software. Some of these jobs are executed at regular intervals, while others are called up when a need arises.

A piece of software called a job scheduler may be used to centrally manage a plurality of jobs for their execution on a single computer. The job scheduler accepts registration of multiple job requests and schedules them in an appropriate order so that the jobs will be executed efficiently on a given computer environment. More specifically, the job scheduler coordinates the execution order of registered jobs and determines the date and time of job execution, while ensuring the allocation of computer resources for concurrent jobs.

For example, one proposed method of job scheduling takes into consideration the system load of a computer, as well as the degree of parallelism of jobs in execution. When a new job is registered, this computer checks the current system load, including that of central processing unit (CPU) and disk storage. If the system load exceeds a threshold, the computer holds the new job without executing it immediately. The computer also checks the degree of parallelism (i.e., the number of jobs being executed concurrently) and similarly regulates the execution of new jobs depending thereon. See, for example, Japanese Laid-open Patent Publication No. 2010-186347.

A single job scheduler may be able to centrally control all the jobs on a computer, but that is not the only case. Security software, for example, may contain a dedicated job scheduler to run a virus scan at regular intervals. Operating system (OS) software may also have its own job scheduler to check the release of new program updates on a regular basis. As seen from these examples, a computer executes multiple jobs coordinated by two or more schedulers. When viewed from the standpoint of one particular job scheduler, some jobs are executed under its direct management while the other jobs are not. The present description refers to the former group of jobs as "managed jobs" and the latter non-managed group of jobs as "foreign jobs" when distinguishing them from the scheduler's viewpoint.

The presence of such foreign jobs would pose some uncertainty to the execution of managed jobs because those foreign jobs consume resources of the information processing apparatus on which they run. In other words, the managed jobs could fail to finish in their assigned times due to the consumption of resources by foreign jobs. It is therefore preferable that the job scheduler performs scheduling in consideration of the presence of foreign jobs. For example, a job scheduler may be configured to identify all possible foreign jobs and take all of them into consideration when scheduling managed jobs. This scheduler design, however, would simply increase the load of job scheduling.

SUMMARY

According to an aspect of the embodiments discussed herein, there is provided a non-transitory computer-readable medium storing a program. This program causes a computer to perform a process including the following acts: referring to registered jobs in a scheduler for execution on an information processing apparatus; obtaining job history information including execution records of one or more other jobs not registered in the scheduler; estimating, based on the obtained job history information, resource usage during an execution time period scheduled for each of the jobs registered in the scheduler, the resource usage including resource usage of at least one of the other jobs to be executed together with the registered jobs on the information processing apparatus; and scheduling jobs including the registered jobs and the at least one of the other jobs, when the estimated resource usage during the execution time periods satisfies predetermined conditions.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 illustrates an example of a resource information table;

FIG. 9 illustrates an example of a managed job table;

FIG. 10 illustrates an example of a virtual job table;

FIG. 11 illustrates an example of a suspend job table;

FIG. 16 illustrates an example of a file conflict and its solutions;

FIG. 19 illustrates an example of a CPU resource conflict and its solutions;

DESCRIPTION OF EMBODIMENTS

Several embodiments will be described below with reference to the accompanying drawings.

(a) First Embodiment

Figure 1:
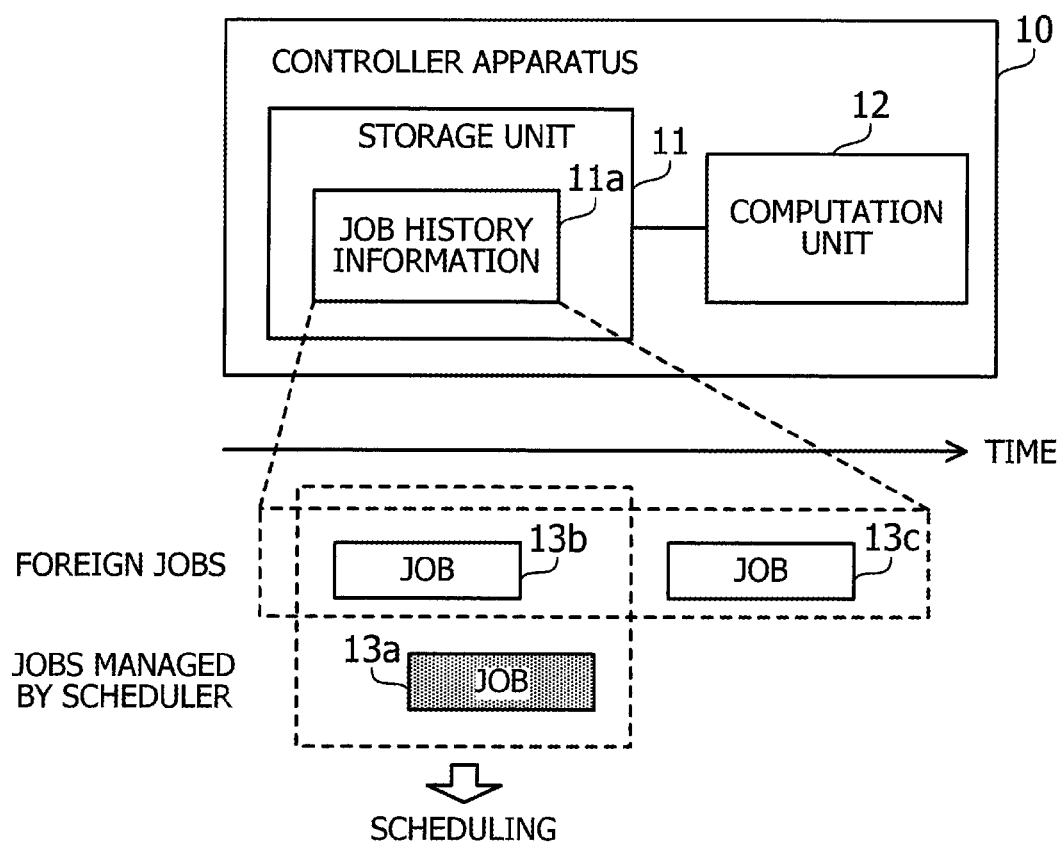
FIG. 1 illustrates a controller apparatus according to a first embodiment.

FIG. 1 illustrates a controller apparatus according to a first embodiment. The illustrated controller apparatus 10 of the first embodiment uses a scheduler to coordinate execution of jobs. The controller apparatus 10 may be a computer or other processing device. Jobs are executed at user-specified regular intervals to provide some specific services relating to management of server devices, storage devices, communication devices, and other information devices. Jobs may be executed by the controller apparatus 10 itself or may be delegated to other similar devices or computers.

The controller apparatus 10 includes a storage unit 11 and a computation unit 12. The storage unit 11 may be a collection of volatile storage devices (e.g., random access memory, RAM) or non-volatile storage devices (e.g., hard disk drive, HDD). The computation unit 12 is, for example, a processor such as central processing unit (CPU) and digital signal processor (DSP). It is also possible to use an application specific integrated circuit (ASIC), field-programmable gate array (FPGA), or other integrated circuits as part of the computation unit 12. The processor executes programs stored in semiconductor memory devices such as RAM. The term "processor" may denote a single processing device or a multiprocessor system including two or more processing devices.

The storage unit 11 stores job history information 11a, which is a collection of past execution records of jobs. FIG. 1 illustrates three jobs 13a, 13b, and 13c to be executed by a single device (e.g., controller apparatus 10). One job 13a has been registered in a particular scheduler, and is thus referred to as a managed job. Other two jobs 13b and 13c, on the other hand, are foreign jobs, not registered in the noted scheduler. For example, these foreign jobs 13b and 13c may belong to some other scheduler not illustrated in FIG. 1. The job history information 11a includes execution records of at least foreign jobs 13b and 13c, which may have been collected from a processing device that is assigned to execute the jobs 13b and 13c. The stored job history information 11a may further include execution records of the managed job 13a.

Based on the job history information 11a, the computation unit 12 estimates resource usage during a scheduled execution time period of the managed job 13a. It is noted that the resource usage could be affected by concurrent execution of foreign jobs, if any. It is also noted that the computation unit 12 focuses on the scheduled execution time period of the managed job 13a in this estimation. In other words, there is no need for the computation unit 12 to estimate resource usage in other time ranges. As FIG. 1 illustrates, the computation unit expects that one foreign job 13b overlaps with the managed job 13a, while the other foreign job 13c does not. The computation unit 12 has no need to consider the latter job 13c in this case. For example, the computation unit 12 retrieves execution records from a limited portion of the job history information 11a that corresponds to the scheduled execution time period of the job 13a.

The computation unit 12 then determines whether the estimated resource usage satisfies predetermined conditions throughout the scheduled execution time period of the job 13a. When the predetermined conditions are satisfied, the computation unit 12 subjects the managed job 13a and its overlapping foreign job 13b to a scheduling process. The computation unit 12 otherwise leaves the jobs 13a and 13b as is.

Each of the two jobs 13a and 13b may make access to a file or files, and that would affect the resource usage. That both jobs 13a and 13b make access to the same file at the same time may be one of the noted predetermined conditions in this case. The resource usage may also include CPU load of each job 13a and 13b. That the total CPU load exceeds a threshold may be another one of the predetermined conditions. To put it in another way, the above "predetermined conditions" refer to the risk of causing a large delay in the execution of either a managed job or a foreign job when these two jobs are executed in parallel.

The scheduling process may take some specific actions on the managed job 13a or foreign job 13b, which include, for example, shifting the scheduled execution time period of a job by some amount of time. If it is possible, the computation unit 12 advances the start time of the managed job 13a. When this time shifting is not applicable because of, for example, the presence of other managed jobs, the computation unit 12 alternatively delays the managed job 13a or foreign job 13b, whichever is lower in priority. In the case where the managed job 13a has been rescheduled, the computation unit 12 starts the job 13a according to the modified schedule. In the case where the foreign job 13b has been rescheduled, the computation unit 12 monitors its actual start time and suspends the job 13b when the detected start time is earlier than expected.

According to the first embodiment discussed above, the proposed controller apparatus 10 estimates the resource usage in the scheduled execution time period of a managed job 13a, taking the expected effect of foreign jobs into consideration. When the estimate of resource usage satisfies predetermined conditions, the controller apparatus 10 runs a scheduling procedure on the managed job 13a and its overlapping foreign job 13b. The proposed controller apparatus 10 schedules its registered job 13a in this way, considering not all the existing foreign jobs, but only a part of them, and thus limiting the possible increase in the load of job scheduling.

(b) Second Embodiment

Figure 2:
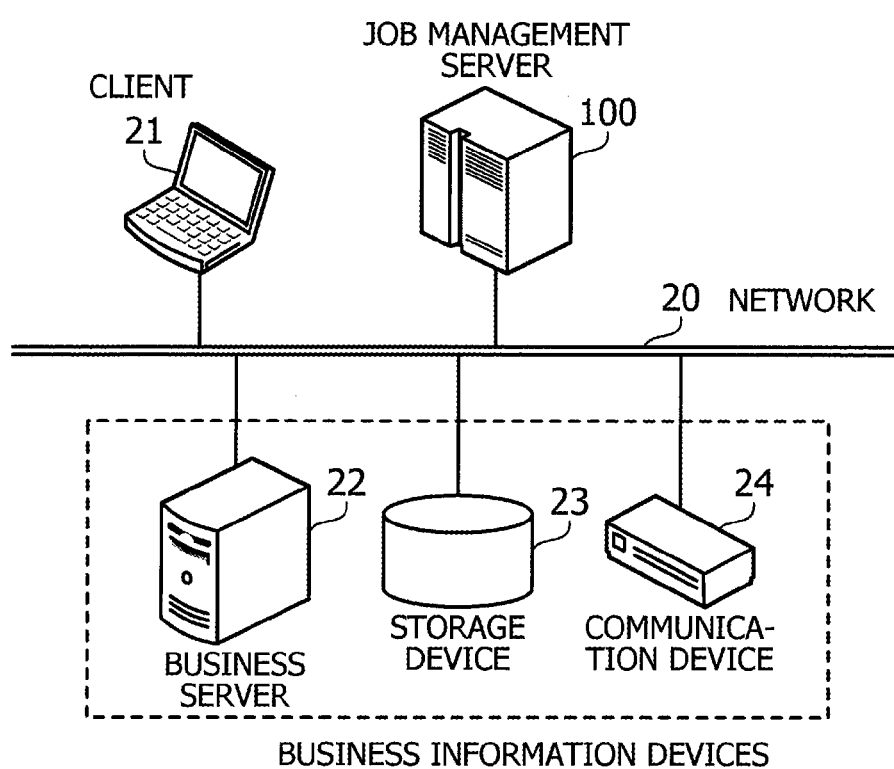
FIG. 2 illustrates an information processing system according to a second embodiment.

FIG. 2 illustrates an information processing system according to a second embodiment. This information processing system manages various business information devices in a consolidated manner. Specifically, the illustrated information processing system is formed from a client 21, a business server 22, a storage device 23, a communication device 24, and a job management server 100. The client 21, business server 22, storage device 23, communication device 24, and job management server 100 are connected to a network 20. The job management server 100 is an example of the controller apparatus 10 discussed previously in the first embodiment.

The client 21, or client computer, serves as a terminal device for a user. The user may be, for example, a manager of the information processing system. Upon entry of each user input, the client 21 sends his or her input information to the job management server 100. The client 21 also outputs information on its display screen when it is received from the job management server 100.

The business server 22, storage device 23, and communication device 24 are information devices used for business purposes. More specifically, the business server 22 is a server computer configured to execute application software for business use. The storage device 23 is a storage device that stores business-related data in non-volatile storage media such as magnetic disks. The storage device 23 may be accessed by the business server 22. The communication device 24 may be a router, switch, or any other kind of network devices used to transfer data.

The job management server 100 is a server computer configured to control management jobs for the business server 22, storage device 23, communication device 24, and other information devices. In the second embodiment, the job management server 100 is configured to take charge of both scheduling and execution of jobs. The job management server 100 may also command other computers to execute jobs. What is executed as jobs includes, for example, powering up and shutdown of information devices, collecting data of operating status from information devices, and updating software installed on information devices.

A scheduler is running on the job management server 100 to schedule a plurality of jobs. This scheduler accepts registration of jobs from the client 21 as requested by the user. The registered jobs are referred to herein as "managed jobs," some of which are executed repetitively at user-specified intervals (e.g., daily, weekly, monthly). The scheduler determines the execution order and start times of these managed jobs and adjusts other scheduling parameters so that the jobs will be executed harmoniously on the job management server 100.

The job management server 100 may also execute other jobs not registered in its native scheduler, concurrently with the managed jobs mentioned above. These jobs are referred to as "foreign jobs." For example, foreign jobs are those jobs that have been registered in some other schedulers because of some difficulties in handling them with the noted native scheduler of the job management server 100. More specifically, the jobs for scanning viruses under the control of security software or checking program updates under the control of OS are classified as foreign jobs. Such foreign jobs may be executed regularly or occasionally. The proposed scheduler of the second embodiment is configured to perform scheduling in consideration of such foreign jobs.

Figure 3:
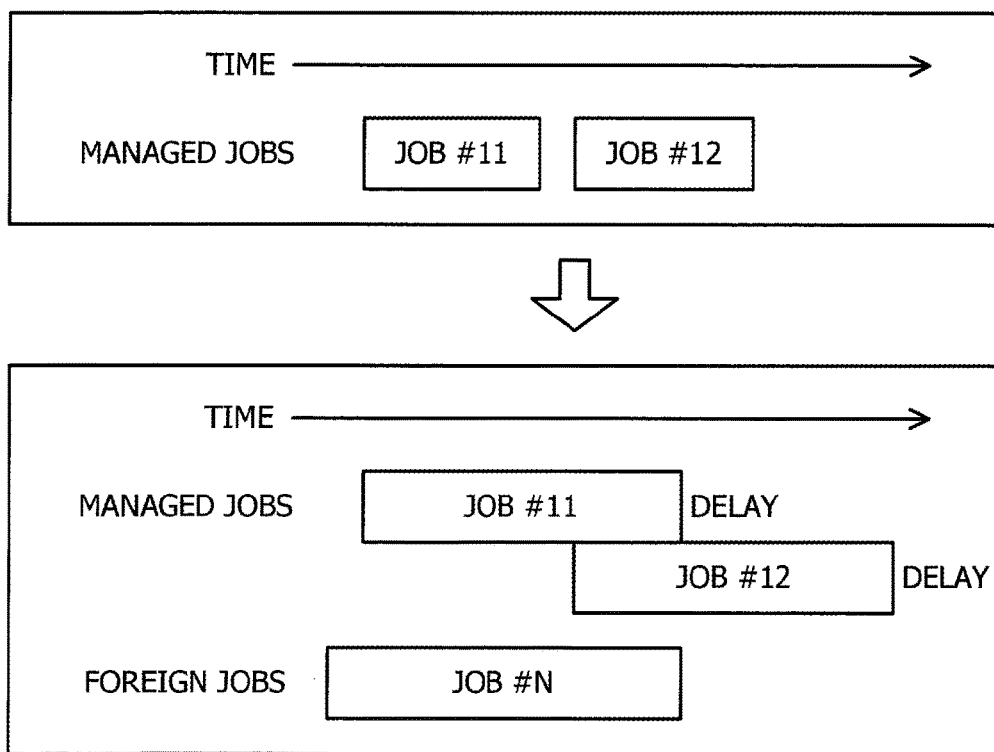
FIG. 3 illustrates an example of a conflict of CPU resources between jobs.

The presence of foreign jobs could cause some difficulties in scheduling jobs as will be described below. FIG. 3 illustrates an example of a conflict of CPU resources between jobs. It is assumed here that the job management server 100 has two managed jobs #11 and #12 registered in its native scheduler. Job #11 is scheduled to start first, and job #12 is to run at its scheduled time that is after the scheduled end time of job #11. The job management server 100 has another job #N to be executed as a foreign job, whose execution time period overlaps with those of jobs #11 and #12. The total CPU load of job #1 and job #N exceeds a threshold, as does the total CPU load of job #12 and job #N.

In the situation described above, the job management server 100 is unable to execute jobs #11 and #12 precisely as scheduled, and both jobs #11 and #12 end up with a delay. That is, CPU resources are consumed by job #N, which the job management server 100 has not considered at the time of scheduling jobs #11 and #12. The resulting shortage of CPU resources slows down the execution of jobs. The presence of foreign job thus leads to an increased CPU load and consequent delay of managed jobs. This problem would be prominent when many managed jobs run in a long series under the tight CPU resource conditions.

Figure 4:
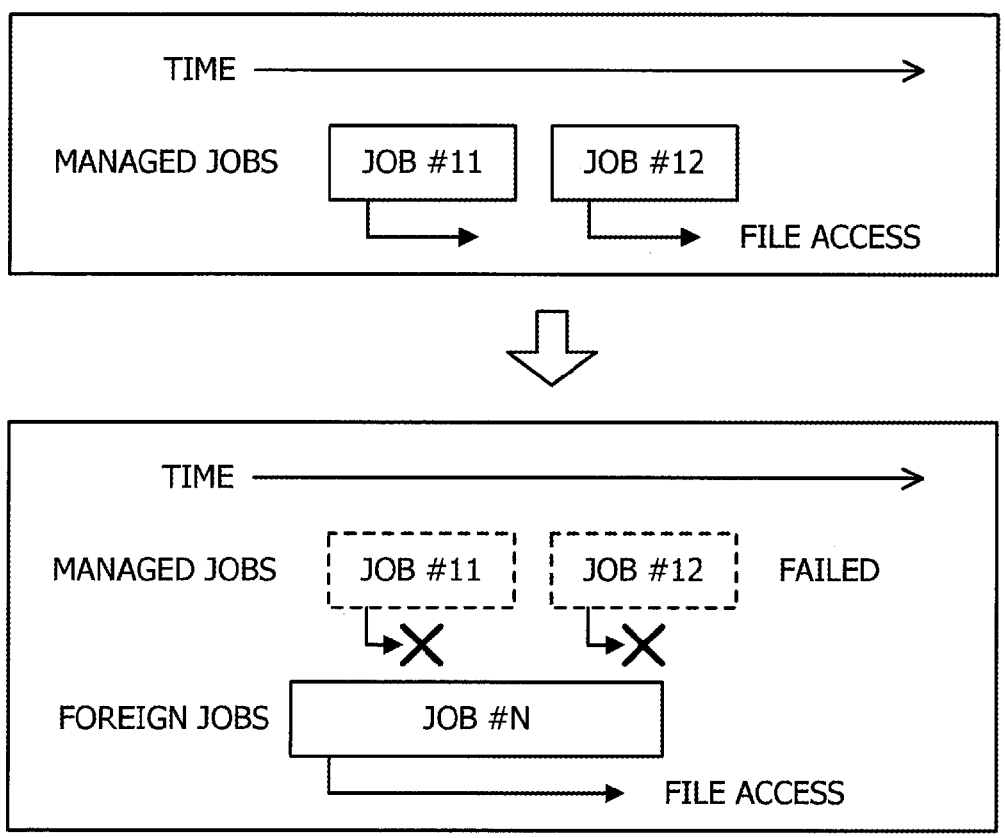
FIG. 4 illustrates an example of a conflict of file access between jobs.

FIG. 4 illustrates an example of a conflict of file access between jobs. It is assumed here that the job management server 100 has two managed jobs #11 and #12 registered in its scheduler as in the foregoing case of FIG. 3. These jobs #11 and #12 are scheduled not to run in parallel, and each of them includes at least one action that makes access to a particular file. The job management server 100 has another job #N to execute as a foreign job, its execution time period overlapping with those of jobs #11 and #12. This foreign job #N also makes access to the same particular file.

The file access operations in jobs #11, #12, and #N are enforced with mutual exclusion as often seen in the case of writing a file to update its content. This means that the job management server 100 may fail to execute jobs #11 and #12 in the scheduled way if the target file is locked by non-scheduled job #N when jobs #11 and #12 need its access. This locking of the file causes jobs #11 and #12 to abort or wait until the lock is lifted. In other words, jobs #11 and #12 take more time to complete.

As can be seen from the above examples, the job management server 100 actually executes several jobs in addition to user-registered managed jobs, and some of those foreign jobs are likely to affect the execution of the managed jobs. In view of this, the job management server 100 is configured to register these extra jobs automatically to its local scheduler as "virtual jobs." While they are foreign by nature, the scheduler handles these virtual jobs together with managed jobs. That is, the scheduler schedules its managed jobs, taking virtual jobs into consideration.

Figure 5:
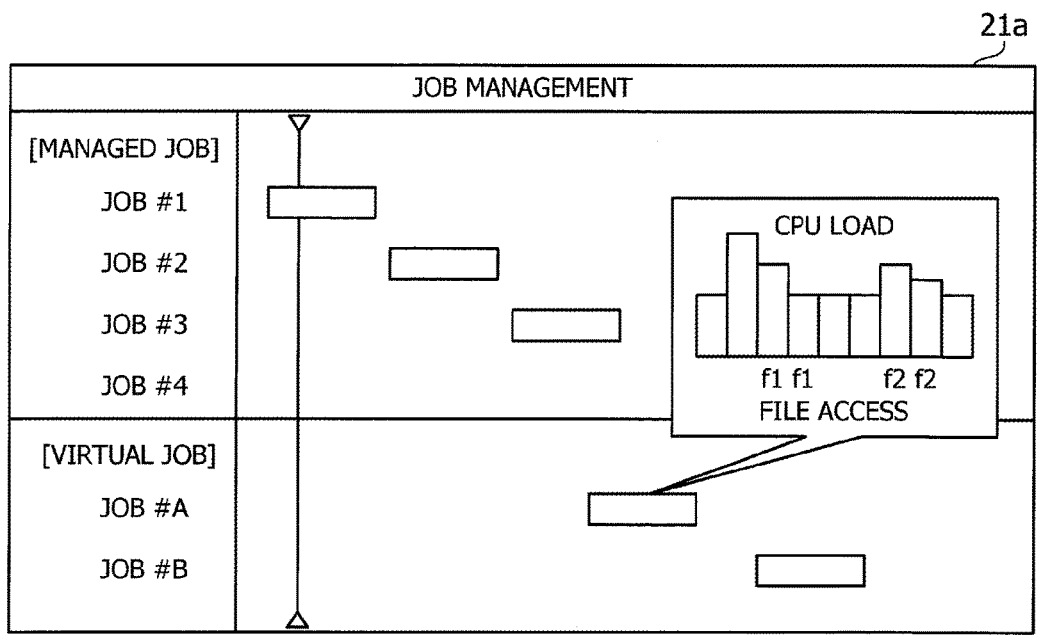
FIG. 5 illustrates an example of visualization of scheduled jobs.

FIG. 5 illustrates an example of visualization of scheduled jobs. The job management server 100 sends display data for a job management window 21a seen in FIG. 5 to a client 21 in response to a request from the same. The client 21 then opens this job management window 21a on its display screen.

The job management window 21a depicts a scheduled sequence of jobs, including managed jobs registered by the user and virtual jobs registered automatically by the job management server 100. Along its horizontal axis representing the time, the job management window 21a gives a picture of execution time periods of scheduled jobs with rectangular symbols. Referring to the example seen in FIG. 5, managed jobs #1 to #4 and virtual jobs #A and #B are arranged. Job #1 is scheduled to start in the first place, which is followed in series by job #2 and then by job #3. Job #A starts before job #3 ends, and job #3 ends before job #A is finished. Job #B starts after the end of job #A. The job management window 21a permits the user to understand the execution order and parallelism of jobs, including virtual jobs.

The job management window 21a further presents information about estimated CPU load and file access of each job. For example, the user may select a rectangular symbol representing a job. In response, a pop-up window appears on the screen to provide information about the selected job's CPU load and file access. To provide such information, the job management server 100 estimates the CPU load and file access in each time segment with a predetermined length (e.g., one minute). Referring to the example of FIG. 5, the illustrated pop-up window depicts how the CPU usage varies during the execution time period of job #A, with a resolution of one minute, together with indication of file access actions.

The next section will now describe hardware configuration and functions of the job management server 100.

Figure 6:
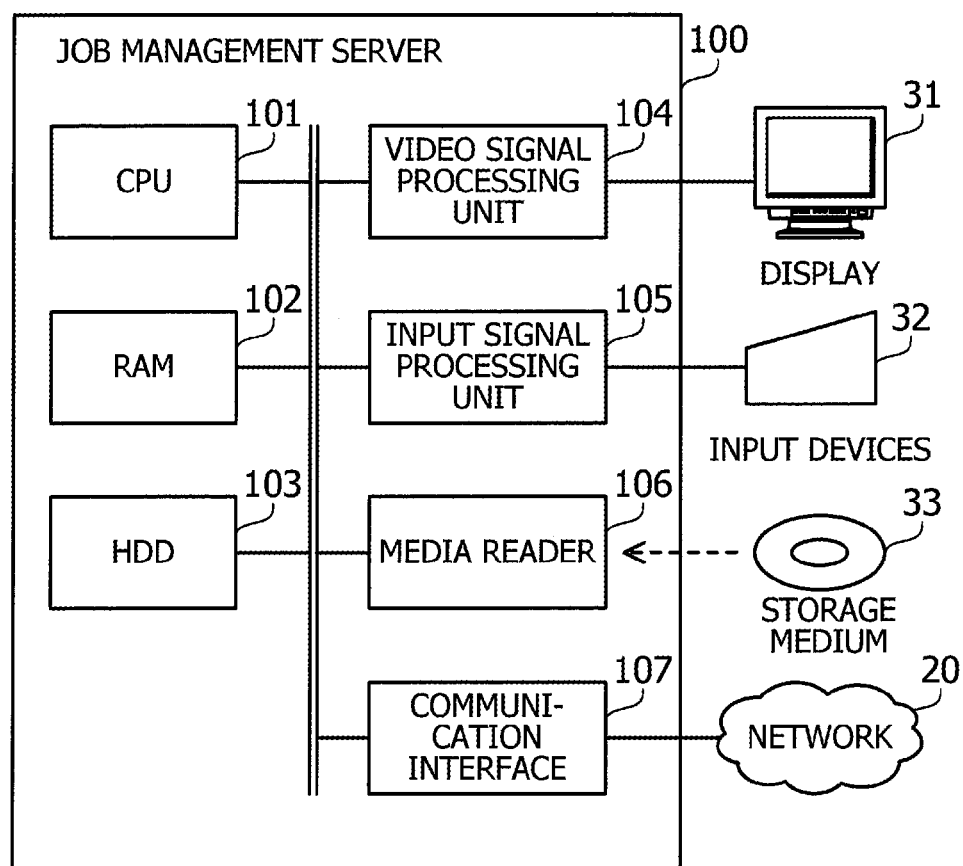
FIG. 6 is a block diagram illustrating an exemplary hardware configuration of a job management server.

FIG. 6 is a block diagram illustrating an exemplary hardware configuration of a job management server. The illustrated job management server 100 includes a CPU 101, a RAM 102, an HDD 103, a video signal processing unit 104, an input signal processing unit 105, a media reader 106, and a communication interface 107. The CPU 101 is an example of the computation unit 12 discussed previously in the first embodiment. The RAM 102 or HDD 103 or both are an example of the storage unit 11 in the first embodiment.

The CPU 101 is a processor containing arithmetic and logic units and other computational mechanisms to execute programmed instructions. The CPU 101 reads at least part of program and data files stored in the HDD 103 and executes programs after loading them on the RAM 102. The CPU 101 may include a plurality of processor cores, and the job management server 100 may include two or more processors. These processors or processor cores may be used to execute a plurality of processing operations (described later) in parallel. The term "processor" may be used to refer to a single processing device or a multiprocessor system including two or more processing devices.

The RAM 102 serves as a temporary memory for at least part of the programs that the CPU 101 executes, as well as for various data that the CPU 101 uses during execution of the programs. The job management server 100 may include other type of memory devices than RAM, as well as two or more sets of memory devices.

The HDD 103 serves as a non-volatile storage device to store program and data files of the OS, middleware, applications, and other classes of software. The job management server 100 may include a plurality of non-volatile storage devices such as flash memories and solid state drives (SSD) in place of, or together with the HDD 103.

The video signal processing unit 104 produces video images in accordance with commands from the CPU 101 and outputs them on a screen of a display 31 coupled to the job management server 100. The display 31 may be, for example, a cathode ray tube (CRT) display, liquid crystal display (LCD), plasma display panel (PDP), organic electro-luminescence display device (GELD), or any other type of display devices.

The input signal processing unit 105 receives input signals from input devices 32 attached to the job management server 100 and supplies them to the CPU 101. The input devices 32 include pointing devices (e.g., mouse, touchscreen, touchpad, trackball), keyboards, remote controllers, push button switches, and the like. It is also possible that two or more different kinds of input devices are connected to the job management server 100.

The media reader 106 is a device used to read programs and data stored in storage media 33. The storage media 33 may include, for example, magnetic disk media such as flexible disk (FD) and HDD, optical disc media such as compact disc (CD) and digital versatile disc (DVD), magneto-optical discs (MO), and semiconductor memory devices. The media reader 106 transfers programs and data read out of a storage medium 33 to, for example, the RAM 102 or HDD 103.

The communication interface 107 is connected to a network 20 to permit the CPU 101 to communicate with a client 21 and other information devices used in the business. The communication interface 107 may be a wired or wireless network interface. In the former case, the job management server 100 is connected to a network device via a cable. In the latter case, the job management server 100 is linked to a base station or an access point via a radio link.

The job management server 100 may omit some devices seen in FIG. 6. For example, the media reader 106 may be optional. The video signal processing unit 104 and input signal processing unit 105 may also be optional in the case where the job management server 100 is designed to operate under the control of the client 21 via the network 20. It is also possible to integrate a display 31 and input device 32 into the enclosure of the job management server 100. While FIG. 6 only illustrates the job management server 100, the same hardware configuration may be applied to the client 21 and business server 22.

Figure 7:
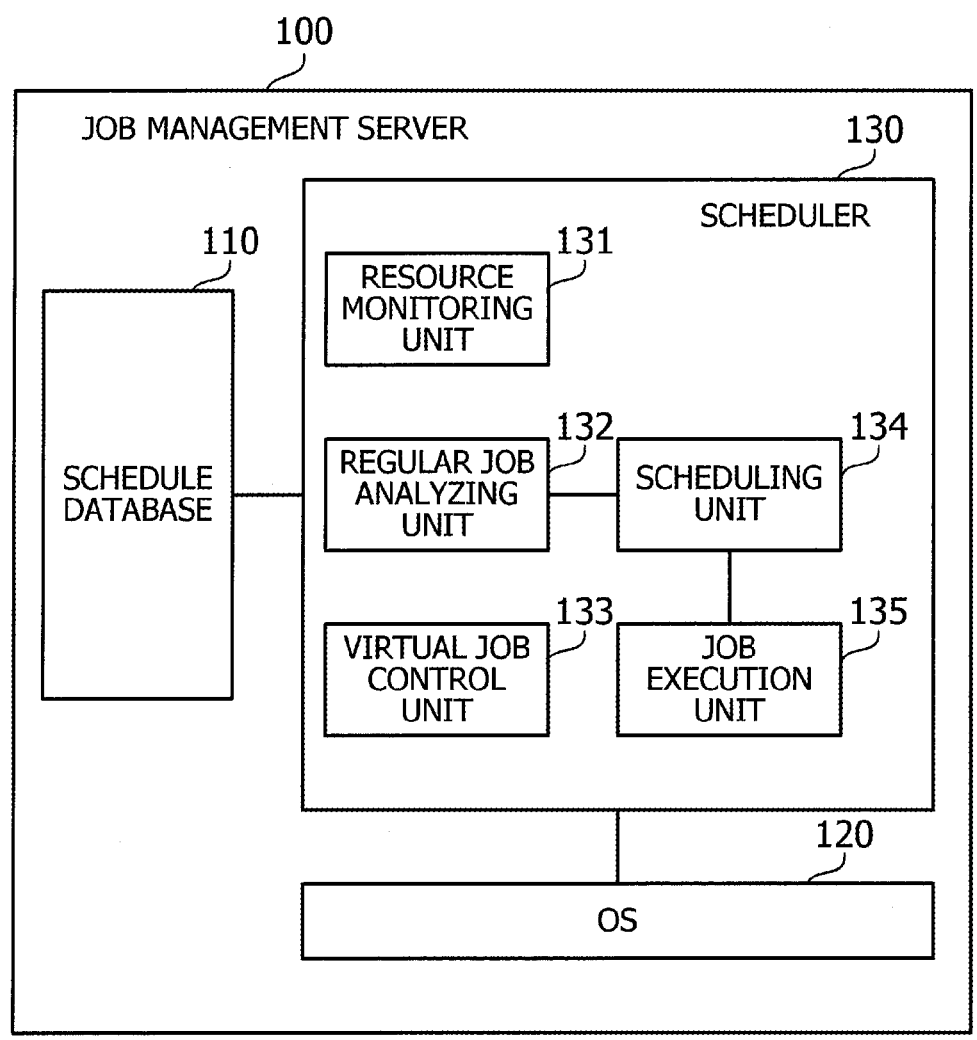
FIG. 7 is a block diagram illustrating an example of functions provided in a job management server.

FIG. 7 is a block diagram illustrating an example of functions provided in a job management server. The job management server 100 includes a schedule database 110, an OS 120, and a scheduler 130. The schedule database 110 may be implemented as a storage space allocated in, for example, the RAM 102 or HDD 103. The scheduler 130 may be implemented as, for example, one of software modules that the CPU 101 executes.

The schedule database 110 stores information about job scheduling. As will be described later, the schedule database 110 stores a resource information table, a managed job table, a virtual job table, and a suspend job table. The resource information table indicates a history of processes executed in the job management server 100. It is mostly the case in the second embodiment that one process corresponds to one job. The managed job table enumerates managed jobs registered by the user, while the virtual job table enumerates virtual jobs registered by the scheduler 130. The suspend job table, on the other hand, indicates particular jobs suspended (i.e., temporarily stopped) by the scheduler 130.

The OS 120 controls execution of processes in the job management server 100. The control includes, for example, a service that provides the scheduler 130 with information about ongoing processes when it is requested. Also included are functions that kill or suspend processes. The scheduler 130 uses these OS functions to kill a job when its execution has to be terminated or to suspend a job when its execution has to be delayed.

The scheduler 130 finds foreign jobs that would affect execution of user-registered managed jobs, registers them as virtual jobs, and controls execution of managed jobs and virtual jobs. To this end, the scheduler 130 includes a resource monitoring unit 131, a regular job analyzing unit 132, a virtual job control unit 133, a scheduling unit 134, and a job execution unit 135.

The resource monitoring unit 131 consults the OS 120 at regular intervals (e.g., every one minute) to obtain information about the condition of processes being executed in the job management server 100. Some processes correspond to managed jobs, while others correspond to foreign jobs. The resource information includes information about CPU usage of each process, as well as about files accessed by the processes. The resource monitoring unit 131 populates a resource information table with the obtained resource information as execution records. The resource monitoring unit 131 may be configured to remove old records from the resource information table when they reach a fixed expiration period.

The regular job analyzing unit 132 analyzes resource information accumulated in the resource information table and extracts foreign jobs that satisfy some predetermined conditions. This operation may be performed at a scheduled time of day (e.g., when the date changes). More specifically, the regular job analyzing unit 132 extracts part of regularly executed foreign jobs that are expected to run this day and likely to have a considerable effect on the execution of managed jobs in terms of CPU usage and file access. The extracted managed jobs are entered to the virtual job table for their registration as virtual jobs. The regular job analyzing unit 132 may also perform the noted operations when so requested by the scheduling unit 134.

The virtual job control unit 133 controls execution of virtual jobs registered in a virtual job table. Virtual jobs may be scheduled by the scheduler 130 similarly to managed jobs, but it is not the scheduler 130 that actually invokes the virtual jobs. For this reason, the virtual job control unit 133 watches the state of virtual jobs and suspends a virtual job upon detection of its earlier startup than its scheduled execution start time.

The scheduling unit 134 receives information about managed jobs from the client 21 in response to user inputs and registers them in a managed job table. The scheduling unit 134 is also activated at a scheduled time of day (e.g., when the date changes) to perform scheduling of managed jobs and virtual jobs for the day. This scheduling takes into consideration the CPU usage and file access by the jobs. That is, the scheduling unit 134 schedules them so as to avoid shortage of CPU resources or contention of file access operations, which may necessitate a modification to the existing schedule to change the execution start time of a managed job or virtual job. The scheduling unit 134 also performs such rescheduling when a new managed job is registered.

The scheduling unit 134 sends display data representing a job management window 21a to the client 21 in response to a request from the same. This job management window 21a depicts a schedule of managed jobs and virtual jobs to be executed today. During execution of managed jobs, the scheduling unit 134 watches for an unexpected emergence of foreign jobs (i.e., those not subjected to the regular job analyzing unit 132). Upon detection of an unexpected foreign job satisfying predetermined conditions, the scheduling unit 134 kills or suspends either the currently running managed job or the detected foreign job. The criterion for this detection is that the foreign job in question is expected to have a considerable effect on the ongoing managed job in terms of CPU usage or file access.

The job execution unit 135 starts managed jobs in accordance with the schedule that the scheduling unit 134 has determined. The job execution unit 135 monitors the execution status of each managed job. When the execution of a job is finished, the job execution unit 135 so notifies the scheduling unit 134.

FIG. 8 illustrates an example of a resource information table. This resource information table 111 is stored as part of the schedule database 110 in the job management server 100. The registered information in the resource information table 111 has been collected by the resource monitoring unit 131. Specifically, the resource information table 111 is formed from the following data fields: Time, Total CPU Usage, Process, Priority, CPU Usage, and File Used.

Time field of a table record indicates the time when the resource monitoring unit 131 obtained that record of resource information. Total CPU Usage field indicates the CPU usage in the entire job management server 100, which is defined to be the ratio of currently used CPU resources to the total amount of CPU resources (including all those in multiple CPUs when that is the case) in the job management server 100. Process field contains the names of one or more processes being executed on the job management server 100.

Priority field indicates execution priority of a job that corresponds to each process seen in the Process field. When the job in question is a managed job, the priority value is what the scheduler 130 is actually using for that job. When the job in question is a foreign job, the Priority field contains a value (e.g., niceness value) used in other schedulers or the like. An appropriate conversion is applied to the original value so as to keep the resulting priority field value compatible with the priorities of managed jobs. CPU Usage field indicates the CPU usage of each corresponding process. File-Used field contains identifiers (e.g., paths and file names) that indicate files accessed by each corresponding process. File-Used field is left blank when the process makes no file access.

The files registered in the File-Used field may be limited to those that are locked during access by the process. For example, the File-Used field may exclude files accessed for reading data and selectively register the files accessed for writing data.

FIG. 9 illustrates an example of a managed job table. This managed job table 112 is stored as part of the schedule database 110 in the job management server 100. The registered information in the managed job table 112 has been produced by the scheduling unit 134 according to the user's indication. Specifically, each record of the managed job table 112 is formed from the following data fields: Job Name, Start Pattern, Scheduled Start Time, Expected Duration, Process, and Priority.

Job Name field contains the name of a managed job specified by the user. Start Pattern field indicates regularity of execution of the managed job. For example, the managed job may be executed daily, weekly (e.g., on the x-th day of every week), or monthly (e.g., on the x-th day of every month). Scheduled Start Time field indicates the time at which the managed job is to start, and Expected Duration field indicates the estimated amount of time that the managed job will take. Process field contains an identifier (e.g., program file name) of a process corresponding to the managed job. Priority field contains a value that the scheduler 130 uses to manage the priorities of managed jobs. For example, the priority of a job may be represented as an integer in the range from one to ten, inclusive.

FIG. 10 illustrates an example of a virtual job table. This virtual job table 113 is stored as part of the schedule database 110 in the job management server 100. The registered information in the virtual job table 113 has been produced by the regular job analyzing unit 132 based on the resource information of foreign jobs. Specifically, the virtual job table 113 is formed from the following data fields: Job Name, Start Pattern, Expected Start Time, Expected Duration, Process, Priority, CPU Usage, File Used, and File Access.

Job Name field contains the name of a virtual job produced from its corresponding process name. Start Pattern field indicates estimated regularity of execution of the virtual job. Expected Start Time field indicates execution start time at which the virtual job is expected to start, and Expected Duration field indicates the estimated amount of time that the virtual job will take. Process field contains an identifier (e.g., program file name) of a process corresponding to the virtual job. Priority field indicates a priority of the virtual job, which has been converted from the original value so as to ensure its compatibility with the priority metrics used in the scheduler 130.

CPU usage field contains a time series of estimated values of the virtual job's CPU usage, with a temporal step size of, for example, one minute. Suppose, for example, that the virtual job in question has an expected duration of 20 minutes. In this case, the CPU usage field enumerates twenty values each representing an estimate of CPU usage in a specific one-minute time segment. File-Used field contains identifiers (e.g., paths and file names) that indicate files accessed by the virtual job. The files registered in this File-Used field may be limited to those that are locked during access by the virtual job. File Access field contains a time series of flag values each indicating occurrence of file access by the virtual job in a particular time segment. For example, this file access field may enumerate twenty flag values. In the case where the same virtual job makes access to a plurality of files, the virtual job table 113 will have as many File-Used fields and File Access fields as the number of accessed files.

The above estimates in Start Pattern, Scheduled Start Time, Expected Duration, CPU Usage, and File Access fields have been calculated from the resource information accumulated in the resource information table 111.

FIG. 11 illustrates an example of a suspend job table. This suspend job table 114 is stored as part of the schedule database 110 in the job management server 100, whose entries are registered by the virtual job control unit 133 and removed by the virtual job control unit 133. Specifically, the suspend job table 114 is formed from the following data fields: Process, Suspend Time, and Scheduled Release Time.

Each entry of the suspend job table 114 describes one suspended virtual job. Process field contains an identifier (e.g., program file name) of a process corresponding to the virtual job being suspended, and Suspend Time field indicates when the virtual job in question was suspended by the virtual job control unit 133. Scheduled Release Time field indicates when the virtual job in question will be allowed to resume its operation. The release time of a virtual job may be equal to, for example, the scheduled start time that the scheduling unit 134 has originally determined for that virtual job. The virtual job control unit 133 registers a virtual job in the suspend job table 114 at the time it suspends the job. When a suspended job resumes, the virtual job control unit 133 removes its entry from the suspend job table 114.

Figure 12:
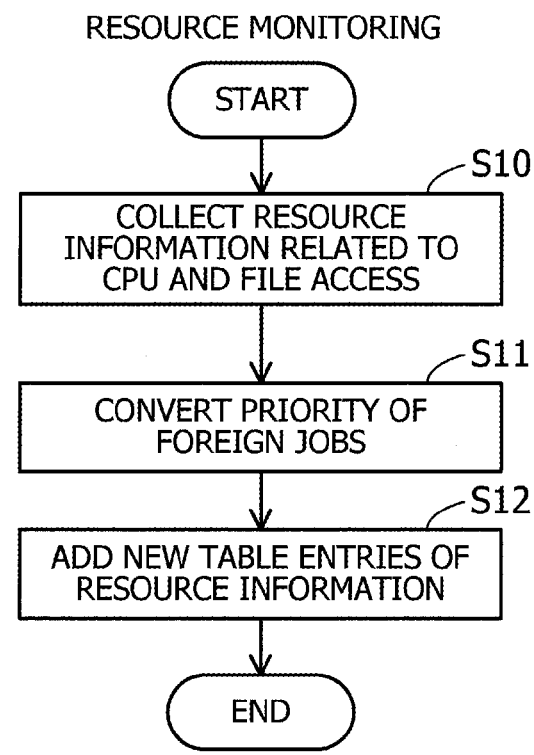
FIG. 12 is a flowchart illustrating an exemplary procedure of resource monitoring.

More specific operations of the job management server 100 will now be described below. FIG. 12 is a flowchart illustrating an exemplary procedure of resource monitoring. The illustrated processing is invoked at regular intervals (e.g., every one minute).

(S10) The resource monitoring unit 131 collects resource information related to CPU and that related to file access. The former resource information includes total CPU usage in the job management server 100, priority of each process, and individual CPU usage of each process. The resource information related to file access includes the names of files used in each process. The resource monitoring unit 131 may limit this detection of files to those that are locked during the write operation.

(S11) The resource monitoring unit 131 searches the resource information collected at step S10 to extract processes that are classified as foreign jobs and converts their priority values (e.g., niceness values) into those compatible with the scheduler 130. For example, the resource monitoring unit 131 consults the managed job table 112 in the schedule database 110 and determines whether the process in question is a managed job or a foreign job. The relationships of priority values between the scheduler 130 and others are previously given to the resource monitoring unit 131.

(S12) The resource monitoring unit 131 adds the collected resource information, together with a timestamp indicating the current time, to the resource information table 111 in the schedule database 110. Here the resource monitoring unit 131 may be configured to delete obsolete records from the resource information table 111.

Figure 13:
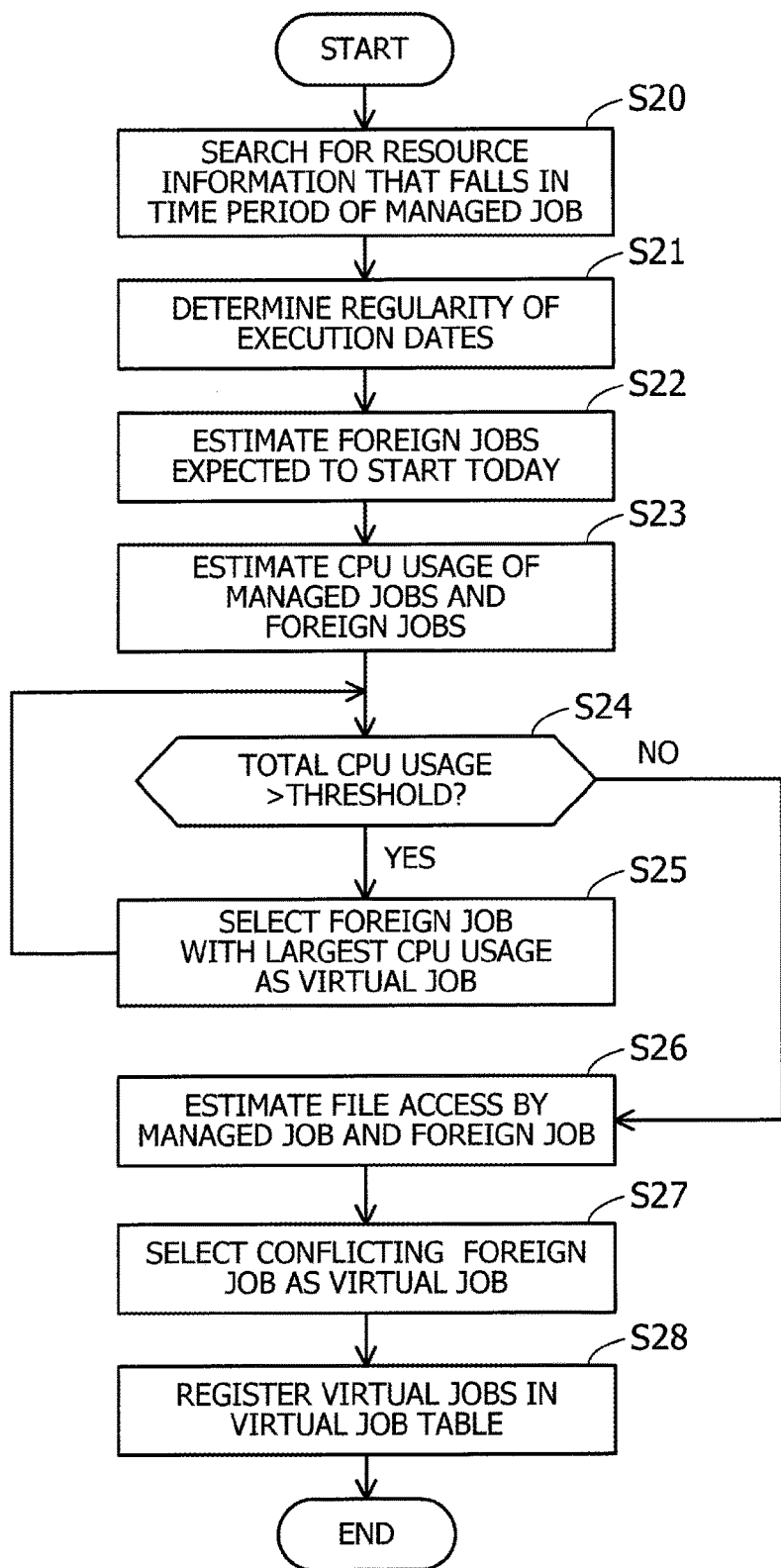
FIG. 13 is a flowchart illustrating an exemplary procedure of regular job analysis.

FIG. 13 is a flowchart illustrating an exemplary procedure of regular job analysis. This procedure begins at the moment when the date changes.

(S20) The regular job analyzing unit 132 consults the managed job table 112 to determine a time period during which one of today's managed jobs is scheduled to run. It then searches the resource information table 111 for a record of the resource information that falls in the determined execution time period of the managed job. More specifically, the regular job analyzing unit 132 seeks a past record indicating a process whose execution time period overlaps with the scheduled execution time period of a managed job. There is no need to search resource information other than that in the execution time period of the managed job.

(S21) The regular job analyzing unit 132 extracts resource information corresponding to foreign jobs from the one found at step S20 and sorts the extracted information into separate sets of records indicating execution of individual foreign jobs. Then, based on those past records of job execution, the regular job analyzing unit 132 determines regularity of each foreign job. For example, a foreign job may be executed at regular intervals, such as daily, weekly, or monthly. Starting on a particular day of the week may be another possible pattern of intermittent execution of foreign jobs. The regular job analyzing unit 132 therefore considers the possibility of such regularity of execution dates. For example, it may be every Monday, the first weekday of every month, or the last weekday of every month.

(S22) Based on the regularity of execution dates determined at step S21, the regular job analyzing unit 132 estimates which foreign jobs may be invoked today. The regular job analyzing unit 132 also estimates expected execution time period of each such foreign job, based on the past records of execution seen from the resource information. For example, the regular job analyzing unit 132 calculates average execution start time and average execution time duration of a foreign job from its past execution records and uses these averages as the estimate of expected start time and execution time duration.

The regular job analyzing unit 132 may optionally be configured to estimate execution time periods, not from the entire set of past execution records, but from its subset whose recorded dates have some commonality with today. For example, when it is Monday today, the estimation may be made from the past execution records collected on Mondays even if the foreign job in question is executed everyday. This selection of past execution records is justified by the possibility that the foreign job may be invoked at different times depending on what day of the week it is.

The regular job analyzing unit 132 may also be configured to estimate an execution time period of a foreign job by analyzing its past records of execution start time and execution time duration to find its particular tendency in these terms. For example, a time series of past execution records may exhibit a monotonous increase or monotonous decrease or any other distinct regularity in the execution time periods of the job in question. The regular job analyzing unit 132 then estimates the job's expected execution time period based on the regularity discovered. The regular job analyzing unit 132 may actually work in this way in the case where, for example, the amount of data manipulated during the course of a daily foreign job increases monotonously from the beginning of a month toward the end of the same.

(S23) The regular job analyzing unit 132 estimates CPU usage of each foreign job of today, based on the past records indicated by resource information. This estimate is made for the CPU usage in each predetermined time segment (e.g., each one-minute period) during the expected execution time period estimated above at step S22. For example, the regular job analyzing unit 132 produces a time series of estimated CPU usage values by averaging CPU usage values at each data point in two or more such time series seen in the past execution records of a job. The regular job analyzing unit 132 may be configured to estimate CPU usages, not from the entire set of past execution records, but from its subset whose recorded dates have some commonality with today. It may also be configured to analyze past records of CPU usage to discover a particular tendency in its temporal variations and estimate today's CPU usage based on the tendency, if any. Further, the regular job analyzing unit 132 similarly estimates CPU usage of managed jobs of today, based on their resource information stored in the resource information table 111. This estimate is made on CPU usage in each time segment during a job's scheduled execution time period.

(S24) For each time segment in the execution time period of a managed job under the scheduling, the regular job analyzing unit 132 calculates the total amount of CPU usage of the scheduled managed job and a possible foreign job that may be executed in that same time segment. The regular job analyzing unit 132 determines whether this total CPU usage exceeds a threshold (e.g., 90%). When the total CPU usage is found to exceed the threshold, the procedure advances to step S25. Otherwise, the procedure proceeds to step S26.

(S25) There may be two or more foreign jobs to be executed in the time segment determined above as having an excessive total CPU usage. When this is the case, the regular job analyzing unit 132 further determines which foreign job exhibits the largest CPU usage and selects it as a virtual job. The regular job analyzing unit 132 then returns to step S24 to recalculate the total CPU usage excluding the virtual job.

(S26) The regular job analyzing unit 132 now estimates what file access is to be made by each expected foreign job of today, based on the past records indicated by resource information. This estimate is made on possible file access in each predetermined time segment during a job's expected execution time period determined above at step S22. The regular job analyzing unit 132 similarly estimates file access by managed jobs of today, based on their resource information stored in the resource information table 111. This estimate is made on possible file access in each predetermined time segment during a job's scheduled execution time period.

(S27) The regular job analyzing unit 132 then checks the possibility of a file conflict between managed jobs and foreign jobs in each time segment during the managed jobs' scheduled execution time periods. A file conflict occurs when a managed job and a foreign job make locked access (as in the case of writing data) to the same target file. When there is a possibility of file conflict between a managed job and a foreign job, the regular job analyzing unit 132 selects the conflicting foreign job as a virtual job.

(S28) The regular job analyzing unit 132 registers the virtual jobs selected at steps S25 and S27 with the virtual job table 113 in the schedule database 110.

Figure 14:
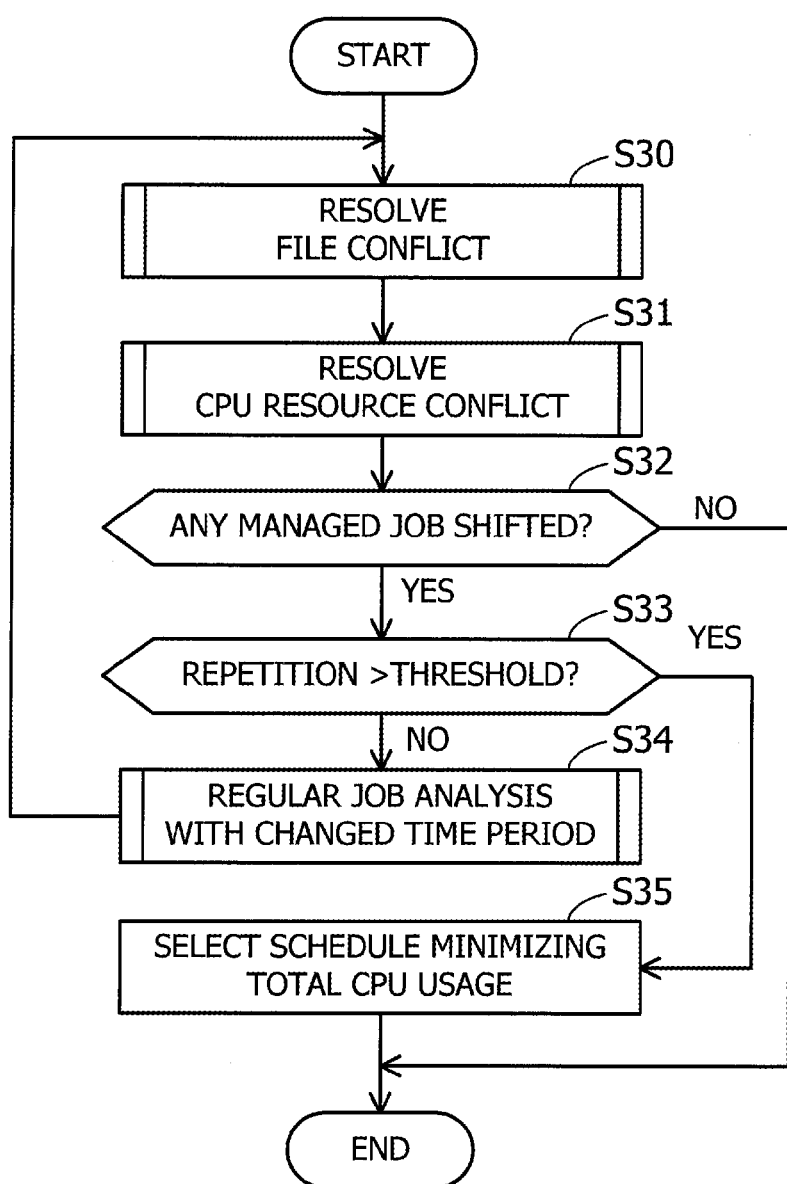
FIG. 14 is a flowchart illustrating an exemplary procedure of rescheduling.

FIG. 14 is a flowchart illustrating an exemplary procedure of rescheduling. This procedure is executed upon changing of the date, and more particularly, right after the regular job analyzing unit 132 has finished its daily registration of virtual jobs in the scheduler 130. This procedure may also be executed upon user-initiated registration of a managed job in the scheduler 130. In the latter case, the regular job analyzing unit 132 has previously extracted virtual jobs pertinent to the execution time period of the registered managed job.

(S30) The scheduling unit 134 checks the possibility of a file conflict between managed jobs of today and any of the registered virtual jobs. If a possible file conflict is found between a managed job and a virtual job, the scheduling unit 134 modifies the start time of one of these two jobs so as to resolve their conflict. The detailed procedure of resolving file conflicts will be discussed in a later section.

(S31) The scheduling unit 134 checks the possibility of a CPU resource conflict between managed jobs of today and registered virtual jobs. The term "CPU resource conflict" refers to the state in which jobs are experiencing shortage of CPU resources, and more specifically, when the total CPU usage by managed jobs and virtual jobs exceeds a threshold (e.g., 90%). If a possible CPU resource conflict is found between a managed job and a foreign job, the scheduling unit 134 modifies the scheduled start time of one of these jobs so as to resolve their conflict. The detailed procedure of resolving CPU resource conflicts will be discussed in a later section.

(S32) The scheduling unit 134 determines whether the above steps S30 and S31 have modified a managed job with its new scheduled start time. When such a modified managed job is present, the procedure advances to step S33. Otherwise, the rescheduling procedure is closed.

(S33) The scheduling unit 134 counts how many times the above steps S30 and S31 have been repeated (or how many of the scheduled start times have been modified). If the counted number exceeds a threshold, the procedure advances to step S35. Otherwise, the procedure proceeds to step S34.

(S34) The scheduling unit 134 requests the regular job analyzing unit 132 to extract virtual jobs related to the execution time period of the modified managed job. In response, the regular job analyzing unit 132 executes the procedure of FIG. 13 to extract virtual jobs in the execution time period specified by the scheduling unit 134. Then the regular job analyzing unit 132 goes back to step S30 and executes again the above-described steps of resolving file conflicts and CPU resource conflicts with reference to modified execution time periods of managed jobs.

Even if the original execution time period is modified, the file conflict or CPU resource conflict may still be persistent and thus necessitate another change in the execution time period of the managed job. It may be unrealistic in some difficult cases to keep the total CPU usage below a threshold throughout the given time range. This is why step S33 is inserted. That is, step S33 discontinues steps S30 and S31 when the loop count of rescheduling managed jobs reaches a certain threshold value.

(S35) The scheduling unit 134 reviews the schedules produced through the repeated steps of S30 and S31 and selects one of them that minimizes the total CPU usage.

Figure 15:
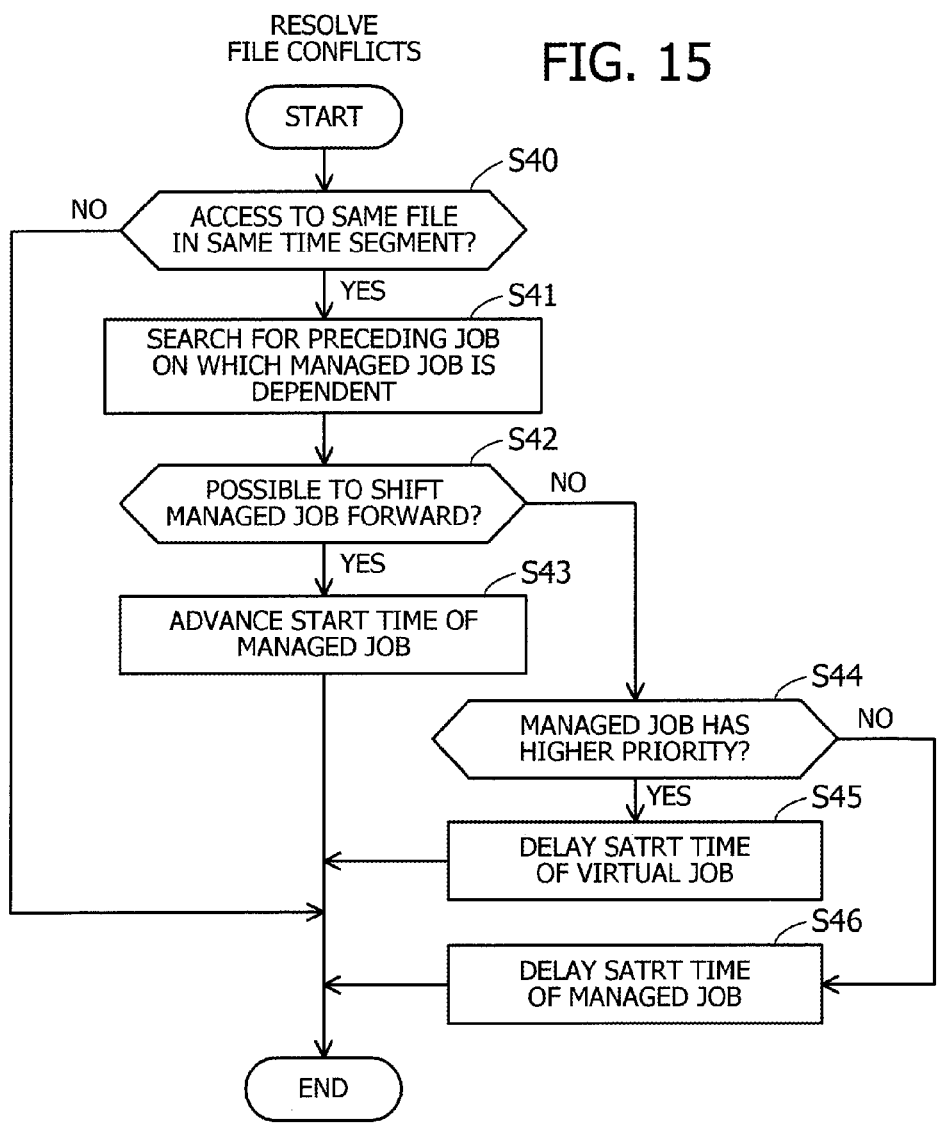
FIG. 15 is a flowchart illustrating an exemplary procedure of resolving a file conflict.

FIG. 15 is a flowchart illustrating an exemplary procedure for resolving a file conflict. This flowchart provides a detailed procedure of what has been described as step S30 in FIG. 14.

(S40) The scheduling unit 134 determines whether there is any file conflict between a managed job and a virtual job (i.e., whether there is a combination of a managed job and a virtual job that make access to the same file in the same time segment). When such a file conflict is found, the procedure advances to step S41. Otherwise, the procedure is closed.

(S41) The scheduling unit 134 searches the resource information table 111 to find a preceding managed job on which the conflicting managed job is dependent. More specifically, what is searched for is another managed job that has to be executed and finished before the conflicting managed job of step S40 begins. This restriction in the execution order, or dependence relationships, may be inferred from past records of job execution indicated by resource information.

(S42) In view of the search result of step S41, the scheduling unit 134 tries to shift the scheduled execution time period of the managed job in the forward direction (i.e., advance the scheduled execution start time) in order to resolve its file conflict with the virtual job. That is, the scheduling unit 134 tries to change the originally scheduled start time of the managed job, not to let its access to a file coincide with the virtual job's in terms of both the destination file and access timing, while ensuring that the managed job will start after the expected end time of a preceding managed job on which it is dependent. The scheduling unit 134 then determines whether it is really possible to do such forward shifting of execution start time. When it is, the procedure advances to step S43. When it is not, the procedure proceeds to step S44.

(S43) The scheduling unit 134 advances the execution start time of the conflicting managed job in the way considered above at step S42. When there are two or more possible solutions for the new execution start time, the scheduling unit 134 may choose the one with the smallest amount of shift. The scheduling unit 134 then exits from this procedure of resolving file conflicts.

(S44) With reference to the managed job table 112 and virtual job table 113, the scheduling unit 134 compares the two conflicting jobs in terms of their priorities. When the managed job has a higher priority than the virtual job, the procedure advances to step S45. Otherwise, the procedure executes step S46.

(S45) The scheduling unit 134 delays the execution start time of the conflicting virtual job, meaning that the managed job is executed in preference to the virtual job. When there are two or more possible solutions for the new execution start time, the scheduling unit 134 may choose the one with the smallest amount of shift. The scheduling unit 134 then exits from this procedure of resolving file conflicts.

(S46) The scheduling unit 134 delays the execution start time of the conflicting managed job, meaning that the virtual job is executed in preference to the managed job. When there are two or more possible solutions for the new execution start time, the scheduling unit 134 may choose the one with the smallest amount of shift.

FIG. 16 illustrates an example of a file conflict and its solutions. It is assumed here that a managed job runs in eight consecutive time segments (e.g., 8-minute time), as does a virtual job. The managed job makes access to file f1 in its sixth and seventh time segments, and the virtual job does the same in its second and third time segments. The original schedule estimates that the virtual job is to start four segments after the managed job.

As seen in part (A) of FIG. 16, the original schedule includes a file conflict between the managed job and virtual job since both of them make access to file f1 in the same two time segments. Accordingly the scheduling unit 134 determines whether it is possible to advance the scheduled start time of the managed job. When this forward shifting of the managed job is possible, the scheduling unit 134 reschedules the job in that way to avoid possible file conflicts. For example, the scheduling unit 134 may move the managed job forward by two time segments as depicted in part (B) of FIG. 16.

If it is not possible to shift the managed job forward, the scheduling unit 134 then compares priorities of the two jobs. When the managed job has a higher priority than the virtual job, the scheduling unit 134 delays the start time of the virtual job so as to avoid their file conflict. For example, the scheduling unit 134 delays the virtual job by two time segments as seen in part (C) of FIG. 16. When the managed job has a lower priority than the virtual job, or when they are equal in priority, the scheduling unit 134 delays the scheduled start time of the managed job so as to avoid a file conflict. For example, the scheduling unit 134 delays the managed job by two time segments as seen in part (D) of FIG. 16.

When a certain job needs its rescheduling to avoid conflicts, it is generally preferable to advance its start time, rather than to delay the same, not to restrict the scheduling of subsequent jobs as much as possible. That is, delaying a job's execution time period is not always a preferable option because it would add some constraints to scheduling of other jobs that follow the delayed job. Unlike managed jobs, it is difficult to shift virtual jobs forward since the scheduler 130 is unable to control their start time per se. The scheduler 130 can, however, give a delay to virtual jobs by suspending them when they have started earlier than expected.

Figure 17:
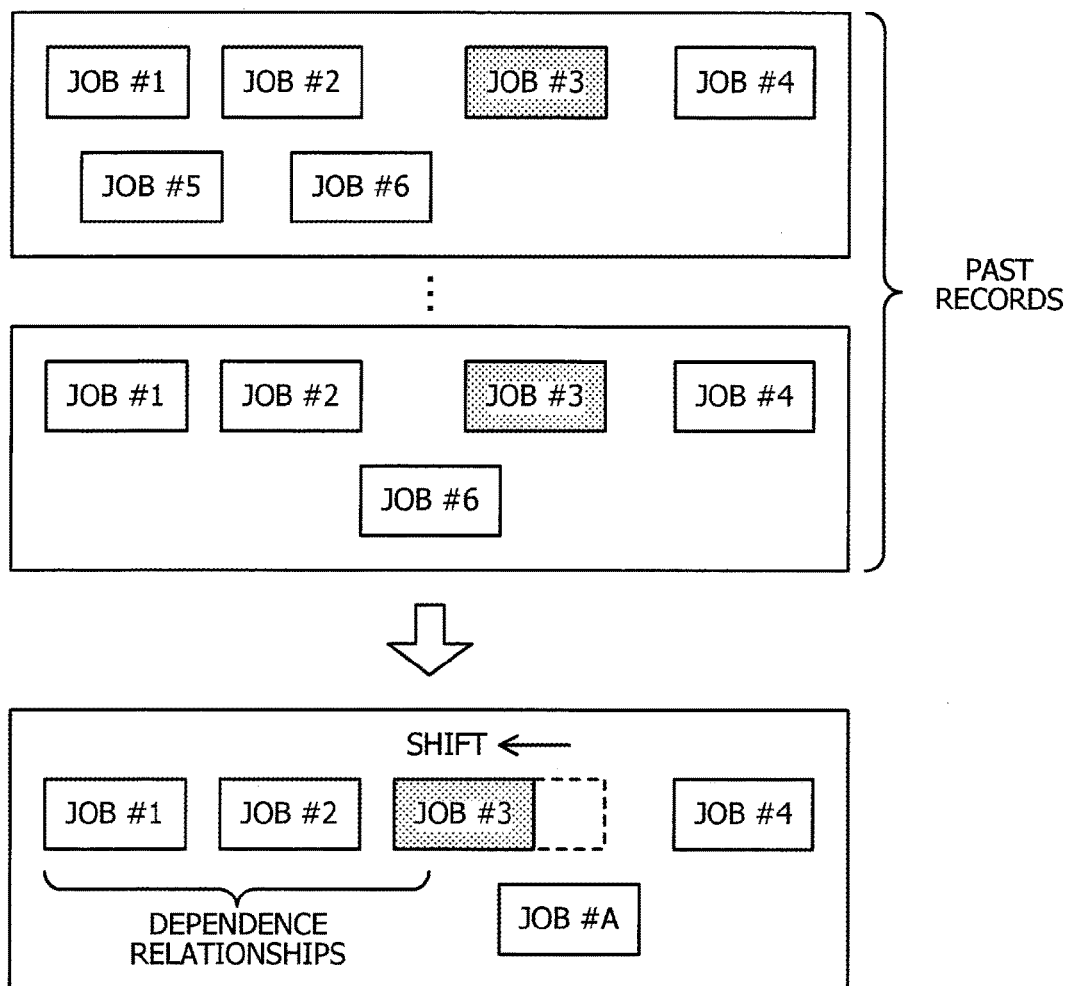
FIG. 17 illustrates an example of time shifting of managed jobs.

FIG. 17 illustrates an example of time shifting of managed jobs. As describe above, an earlier execution start time of a managed job is achieved by finding a preceding managed job on which the moving managed job is dependent and then determining a new execution start time depending on the schedule of that preceding managed job. The presence of such a preceding managed job may be inferred from the past execution records in the resource information as will be described below.

When rescheduling a managed job, the scheduling unit 134 searches past records of job execution to find other managed jobs that were finished before the managed job in question was invoked. Suppose now that, on every execution date of managed job #3, two managed jobs #1 and #2 are executed and finished always before job #3 begins. Unlike these jobs #2 and #3, another managed job #5 may be or may not be executed on the same day. Yet another managed job #6 is executed and finished, sometimes before managed job #3 begins, other times after managed job #3 begins.

With the past records described above, the scheduling unit 134 identifies managed jobs #1 and #2 as preceding the managed job #3 in question and recognizes dependence relationships of them. When these managed jobs #1 and #2 are listed in today's job schedule, the scheduling unit 134 is allowed to advance the scheduled execution start time of managed job #3 as long as it does not reach the expected end times of managed jobs #1 and #2, as seen in the bottommost part of FIG. 17.

Figure 18:
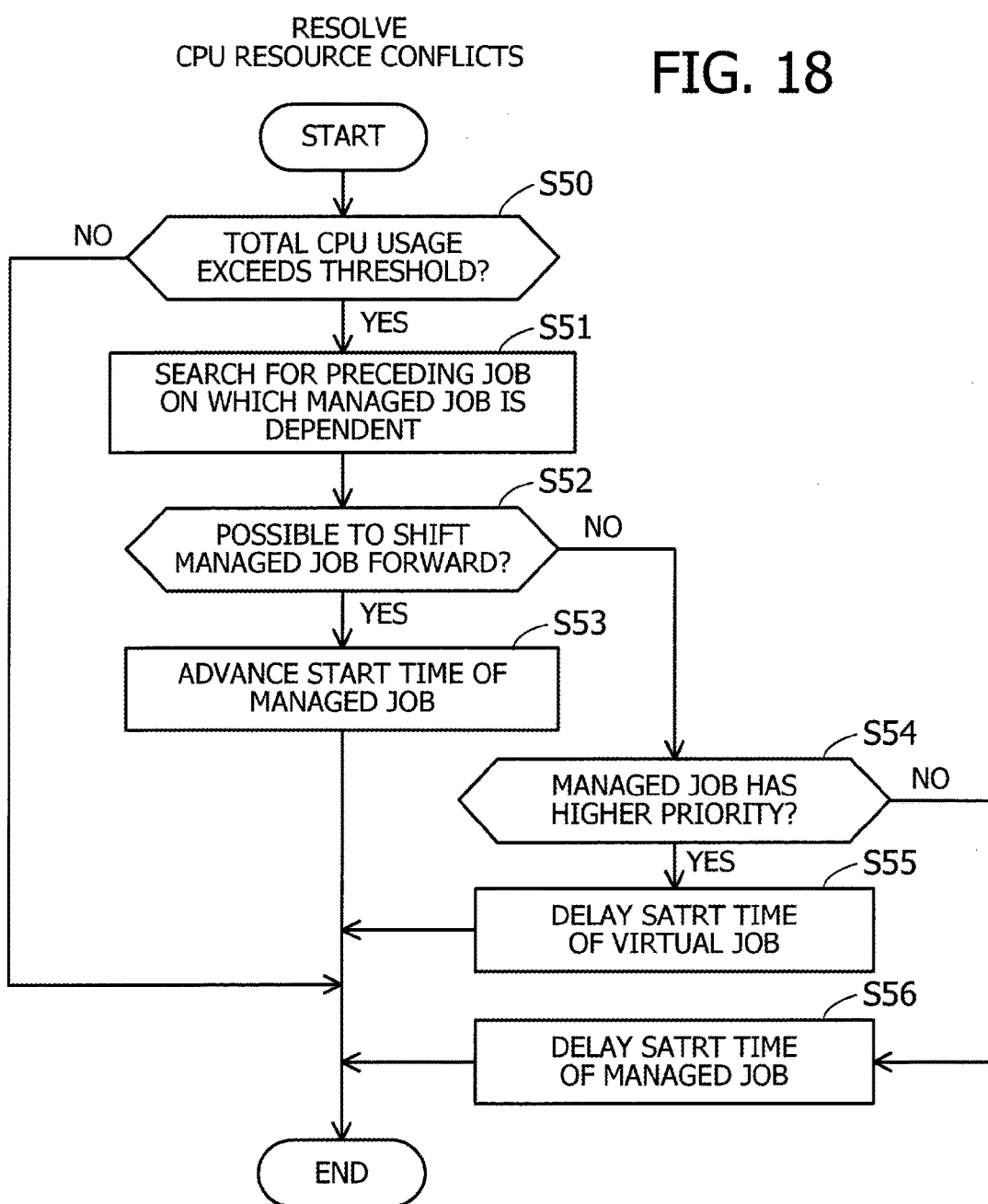
FIG. 18 is a flowchart illustrating an exemplary procedure of resolving a CPU resource conflict.

FIG. 18 is a flowchart illustrating an exemplary procedure of resolving a CPU resource conflict. This flowchart provides a detailed procedure of what has been described as step S31 in FIG. 14.

(S50) The scheduling unit 134 determines whether there is any CPU resource conflict between a managed job and a virtual job. More specifically, the scheduling unit 134 determines whether there is an overloaded time segment whose expected total CPU usage exceeds a threshold (e.g., 90%). When a CPU resource conflict is present, the procedure advances to step S51. Otherwise, the procedure is closed.

(S51) The scheduling unit 134 searches the resource information table 111 to find a preceding managed job on which the conflicting managed job is dependent. As noted previously, this dependence relationship between jobs may be inferred from past execution records of jobs seen in the resource information.

(S52) In view of the search result of step S51, the scheduling unit 134 tries to shift the scheduled execution time period of the managed job in the forward direction (i.e., advance the scheduled start time) in order to resolve its CPU resource conflict with the virtual job. That is, the scheduling unit 134 tries to change the originally scheduled start time of the managed job, not to let the total CPU usage exceed the threshold in any of the time segments, while ensuring that the managed job will start after the expected end time of a preceding managed job on which it is dependent. The scheduling unit 134 then determines whether it is really possible to do such forward shifting of execution start time. When it is, the procedure advances to step S53. When it is not, the procedure proceeds to step S54.

(S53) The scheduling unit 134 advances the execution start time of the conflicting managed job in the way considered above at step S52. When there are two or more possible solutions for the new execution start time, the scheduling unit 134 may choose the one with the smallest amount of shift. The scheduling unit 134 then exits from this process of resolving CPU resource conflicts.

(S54) With reference to the managed job table 112 and virtual job table 113, the scheduling unit 134 compares the two conflicting jobs in terms of their priorities. When the managed job has a higher priority than the virtual job, the procedure advances to step S55. Otherwise, the procedure executes step S56.

(S55) The scheduling unit 134 delays the execution start time of the conflicting virtual job, When there are two or more possible solutions for the new execution start time, the scheduling unit 134 may choose the one with the smallest amount of shift. The scheduling unit 134 then exits from this procedure of resolving CPU resource conflicts.

(S56) The scheduling unit 134 delays the execution start time of the conflicting managed job. When there are two or more possible solutions for the new execution start time, the scheduling unit 134 may choose the one with the smallest amount of shift.

FIG. 19 illustrates an example of a CPU resource conflict and its solutions. It is assumed here that a managed job is executed in nine consecutive time segments (e.g., 9-minute time), whereas a virtual job runs in thirteen consecutive time segments. During its 9-segment execution time period, the managed job is expected to consume CPU resources as in {3p, 4p, 3p, 8p, 9p, 8p, 5p, 3p, 2p}, where p represents a unit amount of CPU usage. The virtual job, on the other hand, is expected to consume CPU resources as in {7p, 6p, 6p, 6p, 5p, 4p, 3p, 3p, 3p, 3p, 3p, 2p, 1p} during its 13-segment execution time period. It is also assumed that the virtual job is expected to start five segments after the managed job.

According to the original schedule, the total CPU usage reaches 15p at the sixth time segment of the managed job and goes down to 11p at the seventh time segment. These two-segment period sees a CPU resource conflict between the jobs, where the threshold of total CPU usage is set to 10p, as seen in part (A) of FIG. 19. The scheduling unit 134 thus determines whether it is possible to advance the scheduled start time of the managed job. When this forward shifting of the managed job is possible, the scheduling unit 134 reschedules the job in that way to avoid possible CPU resource conflicts. For example, the scheduling unit 134 may move the managed job forward by two time segments as seen in part (B) of FIG. 19, thereby keeping the total CPU usage below the threshold throughout the execution time period of the managed job.

If it is not possible to shift the managed job forward, the scheduling unit 134 then compares priorities of the two jobs. When the managed job has a higher priority than the virtual job, the scheduling unit 134 delays the expected start time of the virtual job so as to avoid their CPU resource conflict. For example, the scheduling unit 134 delays the virtual job by two time segments as seen in part (C) of FIG. 19, thereby keeping the total CPU usage below the threshold throughout the execution time period of the managed job. When, on the other hand, the managed job has a lower priority than the virtual job, or when they are equal in priority, the scheduling unit 134 delays the scheduled start time of the managed job so as to avoid their CPU resource conflict. For example, the scheduling unit 134 delays the managed job by thirteen time segments as seen in part (D) of FIG. 19, thereby keeping the total CPU usage below the threshold throughout the execution time period of the managed job. As noted previously, it is generally preferable to advance start times, rather than to delay the same, as a solution for a conflict. This rule applies also to the CPU resources conflicts.

The above sections have explained a scheduling method with consideration of foreign jobs that are executed regularly. In reality, however, some foreign jobs are invoked irregularly. The following section will discuss how to deal with this kind of foreign jobs.

Figure 20:
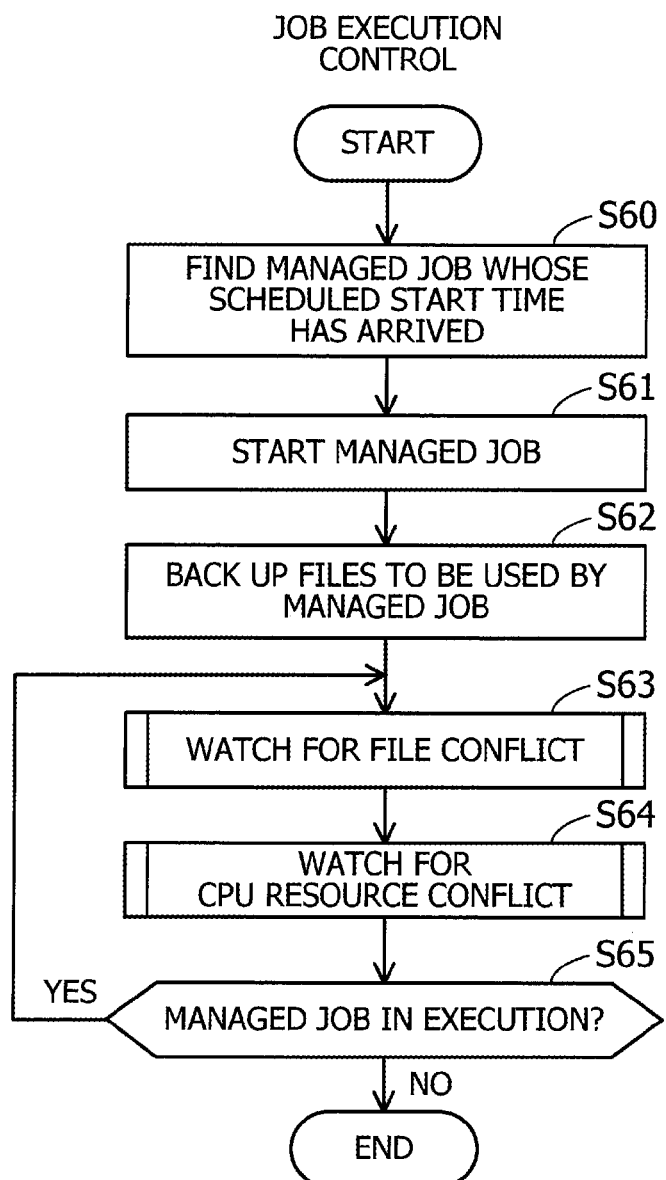
FIG. 20 is a flowchart illustrating an exemplary procedure of job execution control.

FIG. 20 is a flowchart illustrating an exemplary procedure of job execution control.

(S60) The scheduling unit 134 consults the managed job table 112 in the schedule database 110 to find a managed job whose scheduled start time has arrived.

(S61) The scheduling unit 134 commands the job execution unit 135 to start execution of the found managed job. In response, the job execution unit 135 invokes the specified managed job and starts monitoring the execution of that job. When the managed job is finished, the job execution unit 135 so notifies the scheduling unit 134.

(S62) With reference to the managed job table 112, the scheduling unit 134 checks whether the started managed job is to use a file. When such a file is present, the scheduling unit 134 makes a backup copy of the file.

(S63) The resource monitoring unit 131 collects latest resource information. The scheduling unit 134 uses this information to determine whether the currently executed jobs include any irregular foreign jobs that are not registered as virtual jobs. For example, some jobs are executed only once, while other jobs are executed at random intervals. Such one-off jobs and random jobs fall in the category of irregular foreign jobs. The scheduling unit 134 checks the possibility of file conflicts between the managed job invoked at step S61 and an irregular foreign job and takes an action to resolve a file conflict if any. More details of this step will be discussed in a later section.

(S64) The scheduling unit 134 determines whether the current total CPU usage is unusually high. That is, it determines whether the managed job of step S61 is experiencing a CPU resource conflict with an irregular foreign job. When there is a CPU resource conflict, the scheduling unit 134 takes an action to resolve it. More details of this step will be discussed in a later section.

(S65) The scheduling unit 134 determines whether the managed job of step S61 is still in execution. When it is, the procedure goes back to step S63. When the managed job is finished, the scheduling unit 134 closes the procedure of job execution control for the job. The scheduling unit 134 may be configured to discard the backup copy of step S62 at the close.

Figure 21:
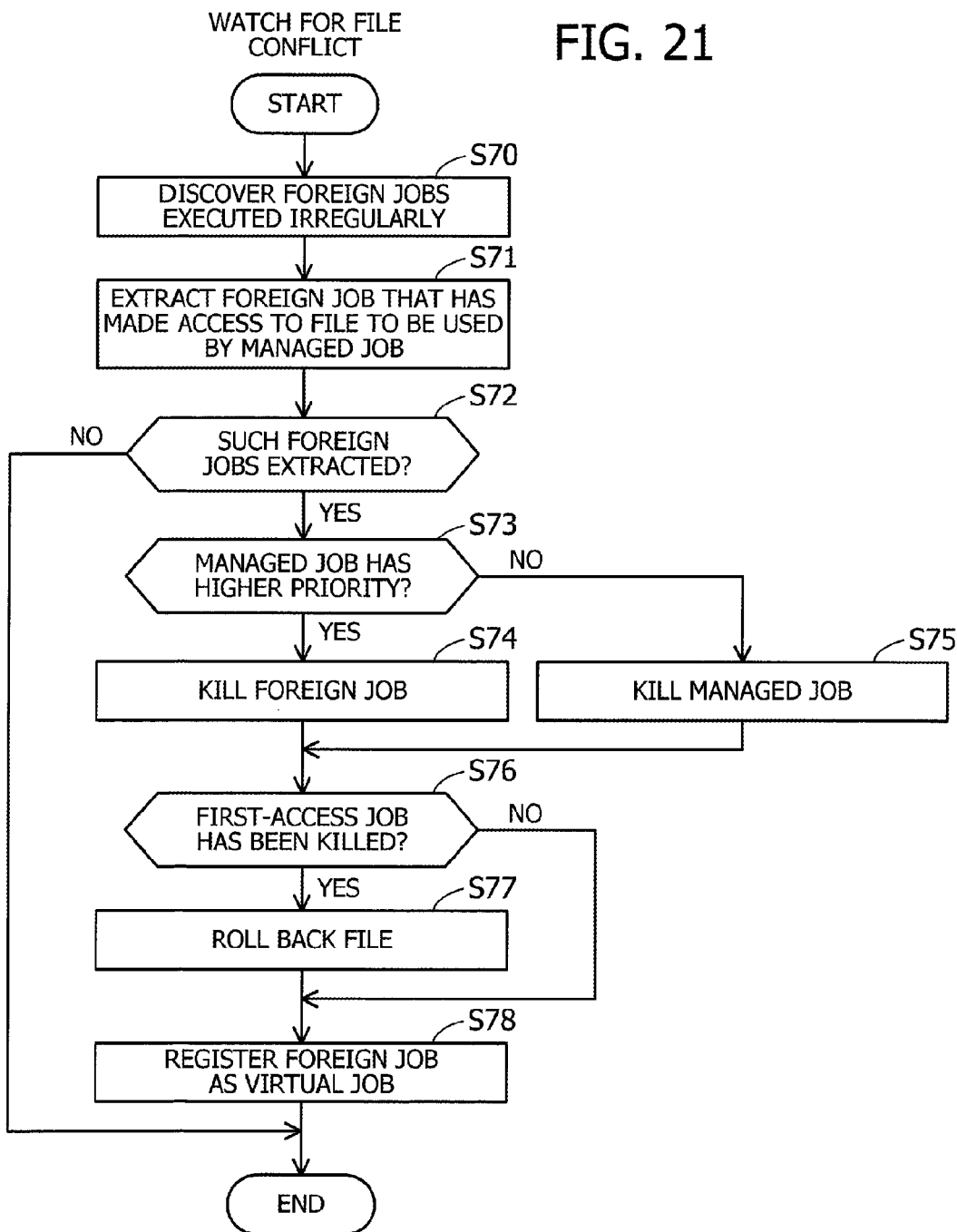
FIG. 21 is a flowchart illustrating an exemplary procedure of watching for file conflicts.

FIG. 21 is a flowchart illustrating an exemplary procedure of watching for file conflicts. This flowchart provides a detailed procedure of what has been described above as step S63 of FIG. 20.

(S70) The scheduling unit 134 examines the latest resource information collected by the resource monitoring unit 131 and discovers irregular foreign jobs in the currently running jobs. More specifically, what is examined at this step S70 is a subset of the jobs in execution, excluding those registered in the managed job table 112 or virtual job table 113.

(S71) The scheduling unit 134 examines each foreign job found at step S70 and extracts a job that has made access to the file to be used by the managed job being executed at present.

(S72) The scheduling unit 134 determines whether the above step S71 has extracted any foreign job that meets the noted conditions. When there is an extracted foreign job, the procedure advances to step S73. The scheduling unit 134 otherwise exits from the procedure since there is no file conflict.

(S73) The scheduling unit 134 examines the priority of the extracted foreign job, which may have been converted from its original value (e.g., niceness value) for the purpose of compatibility with the scheduler 130. The scheduling unit 134 then compares the managed job and foreign job in terms of their priorities. When the managed job has a higher priority than the foreign job, the procedure advances to step S74. Otherwise, the procedure executes step S75.

(S74) The scheduling unit 134 kills (i.e., forcibly stops) the foreign job extracted at step S71. This means that the managed job is executed with priority so as to prevent its file access operations from being disturbed by the foreign job. The operating system 120 offers the scheduling unit 134 a function for killing a foreign job. The killed foreign job will be re-invoked after the managed job is finished. The procedure now skips to step S76.

(S75) The scheduling unit 134 kills the managed job. This means that the foreign job is executed with priority so as to prevent its file access operations from being disturbed by the managed job. The operating system 120 offers the scheduling unit 134 a function for killing a managed job. The killed managed job will be re-invoked after the foreign job is finished.

(S76) The scheduling unit 134 determines which of the above managed job and foreign job has made access to the file in the first place. The scheduling unit 134 then determines whether it is this first-access job that has been killed at step S74 or S75. When it is, the procedure advances to step S77. Otherwise, the procedure skips to step S78.

(S77) Since the file has been modified by the managed job or foreign job noted above, the scheduling unit 134 rolls it back by using the backup copy produced above at step S62. More specifically, the scheduling unit 134 overwrites the modified file with its backup copy. This operation makes the content of the file consistent with the above result of job execution.

(S78) The scheduling unit 134 produces a new entry of the virtual job table 113 to register the foreign job extracted at step S71 as a virtual job. The virtual job section of the foregoing job management window 21a (FIG. 5) includes such foreign jobs executed irregularly. Since it is difficult, however, to estimate their exact duration, a fixed execution time (e.g., 15 minutes) is given to those jobs in the job management window 21a.

Figure 22:
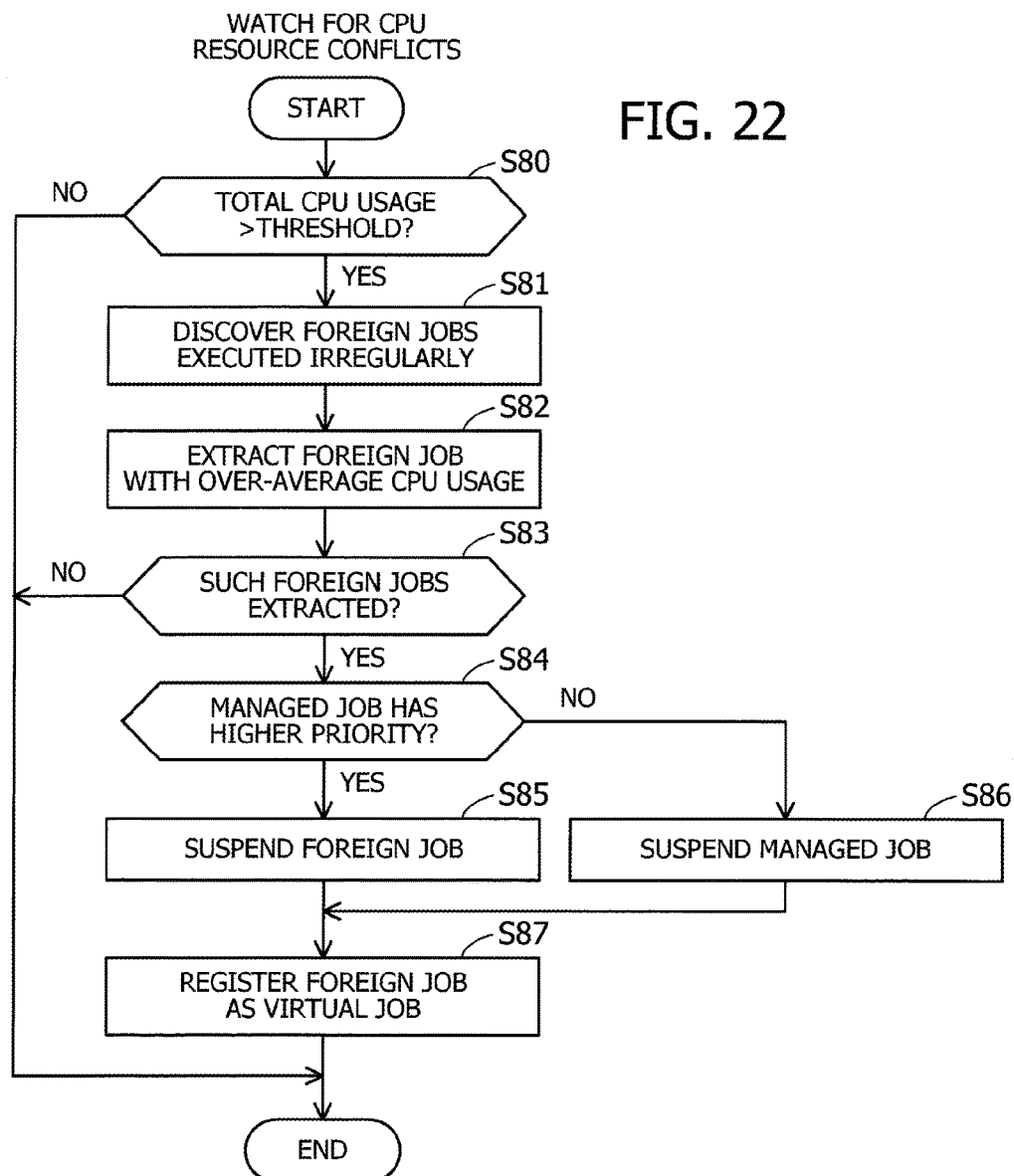
FIG. 22 is a flowchart illustrating an exemplary procedure of watching for CPU resource conflicts.

FIG. 22 is a flowchart illustrating an exemplary procedure of watching for CPU resource conflicts. This flowchart provides a detailed procedure of what has been described above as step S64 in FIG. 20.

(S80) Based on the latest resource information collected by the resource monitoring unit 131, the scheduling unit 134 evaluates the total CPU usage at the present. When the total CPU usage exceeds a threshold (e.g., 90%), the procedure advances to step S81. Otherwise, the scheduling unit 134 exits from this process of watching for CPU resource conflicts.

(S81) The scheduling unit 134 discovers irregular foreign jobs in the currently executed jobs.

(S82) The scheduling unit 134 divides the total CPU usage by the number of jobs in execution, thereby obtaining an average CPU usage per job. The jobs in execution include managed jobs, virtual jobs, and irregular foreign jobs. Some of the irregular foreign jobs discovered at step S81 exhibit a high CPU usage greater than or equal to the average CPU usage. The scheduling unit 134 extracts these foreign jobs as having over-average CPU usage.

(S83) The scheduling unit 134 determines whether the above step S82 has extracted any foreign job that meets the noted conditions. When there is an extracted foreign job, the procedure advances to step S84. The scheduling unit 134 otherwise exits from the procedure since there is no CPU resource conflict.

(S84) The scheduling unit 134 then compares the managed job and foreign job in terms of their priorities. When the managed job has a higher priority than the foreign job, the procedure advances to step S85. Otherwise, the procedure executes step S86.

(S85) The scheduling unit 134 suspends (stops temporarily) the foreign job extracted at step S82. This means that the managed job is executed with priority so as to prevent its execution from being delayed due to the foreign job. The operating system 120 offers the scheduling unit 134 a function for suspending a foreign job. The suspended foreign job will be allowed to resume afterwards (e.g., when the total CPU usage falls down to a sufficiently low level). The scheduling unit 134 then proceeds to step S87.

(S86) The scheduling unit 134 suspends the managed job in execution. This means that the foreign job is executed with priority so as to prevent its execution from being delayed due to the managed job. The operating system 120 offers the scheduling unit 134 a function for suspending a managed job. The suspended managed job will be allowed to resume afterwards (e.g., when the total CPU usage falls down to a sufficiently low level).

(S87) The scheduling unit 134 produces a new entry of the virtual job table 113 to register the foreign job extracted at step S82 as a virtual job. The virtual job section of the foregoing job management window 21a (FIG. 5) includes such foreign jobs executed irregularly.

Figure 23:
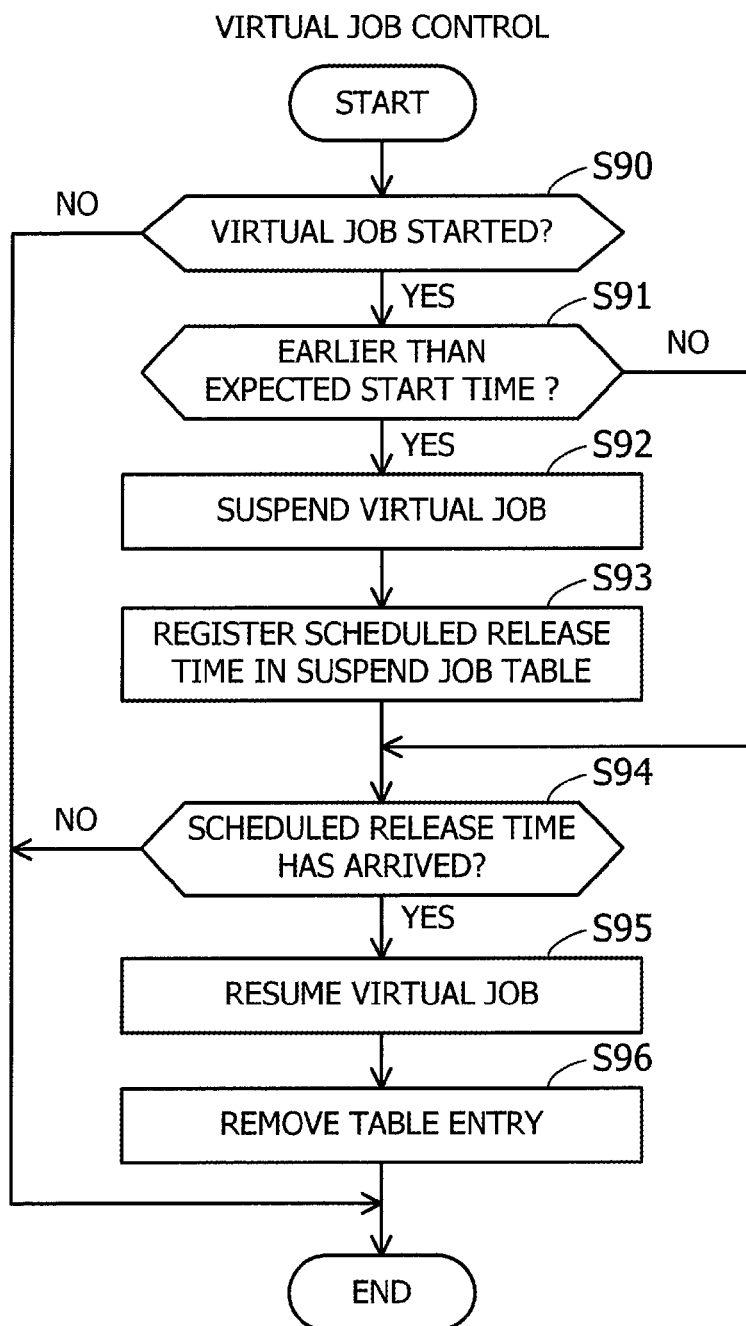
FIG. 23 is a flowchart illustrating an exemplary procedure of virtual job control.

The next section will now discuss how to control execution of virtual jobs. FIG. 23 is a flowchart illustrating an exemplary procedure of virtual job control.

(S90) Monitoring job start commands issued from the operating system 120, the virtual job control unit 133 determines whether any of the virtual jobs registered in the virtual job table 113 is started. Upon detection of a started virtual job, the virtual job control unit 133 hooks its corresponding process (i.e., intercepts the control over the process) and proceeds to step S91. This hooking permits the scheduler 130 to execute some preprocessing operations before the process of the virtual job begins. When there are no such virtual jobs, the virtual job control unit 133 exits from the flow of FIG. 23 for the time being and repeats the job monitoring of step S90.

(S91) The virtual job control unit 133 checks the current time and determines whether it is earlier than the job's expected start time determined by the scheduling unit 134. When the expected start time has not arrived, the procedure advances to step S92. Otherwise, the virtual job control unit 133 skips to step S94.

(S92) The virtual job control unit 133 suspends the virtual job detected at step S90. This suspension is implemented by using the previous hooking of the virtual job process. That is, the virtual job control unit 133 does not return the control to the original process.

(S93) The virtual job control unit 133 updates the suspend job table 114 in the schedule database 110 to register the above suspension of the virtual job. More specifically, it enters the process name, suspend time, and scheduled release time in a new entry of the suspend job table 114, where the scheduled release time is equal to the original start time determined previously by the scheduling unit 134 for the virtual job.

(S94) The virtual job control unit 133 searches the suspend job table 114 to determine whether any of the suspended virtual jobs has reached its scheduled release time. When such a virtual job is found, the procedure advances to step S95. When no such virtual jobs are found, the virtual job control unit 133 exits from this process of virtual job control.

(S95) The virtual job control unit 133 resumes the suspended virtual job, thus permitting the virtual job process to regain the control.

(S96) The virtual job control unit 133 removes the relevant entry from the suspend job table 114. More specifically, it deletes the process name, suspend time, and scheduled release time of the resumed virtual job.

The above sections have described a method for resolving file conflicts and CPU resource conflicts between a managed job and a foreign job. The proposed method estimates execution dates of virtual jobs and manages the execution of scheduled jobs including virtual jobs expected to run today. It is still possible, however, that some of those virtual jobs remain silent, contrary to the expectations, even when their start times arrive. This type of disagreement may be encountered when, for example, a job is postponed from the beginning of the month to the next day, or when a job is advanced from the end of the month to the preceding day. The user may request such temporary changes as part of their daily business activities.

When a virtual job does not start, the absence may propagate to other related virtual jobs, thus resulting in a plurality of absent virtual jobs. Because the job schedule has been established with consideration of those virtual jobs, the noted situation could lead to a large amount of unused resources and consequent inefficiency of processing. The proposed job management server 100 is therefore designed to determine whether the absence of a specific virtual job may hamper the execution of subsequent virtual jobs. When this is very likely, the job management server 100 reschedules the jobs in the way described below.

Figure 24:
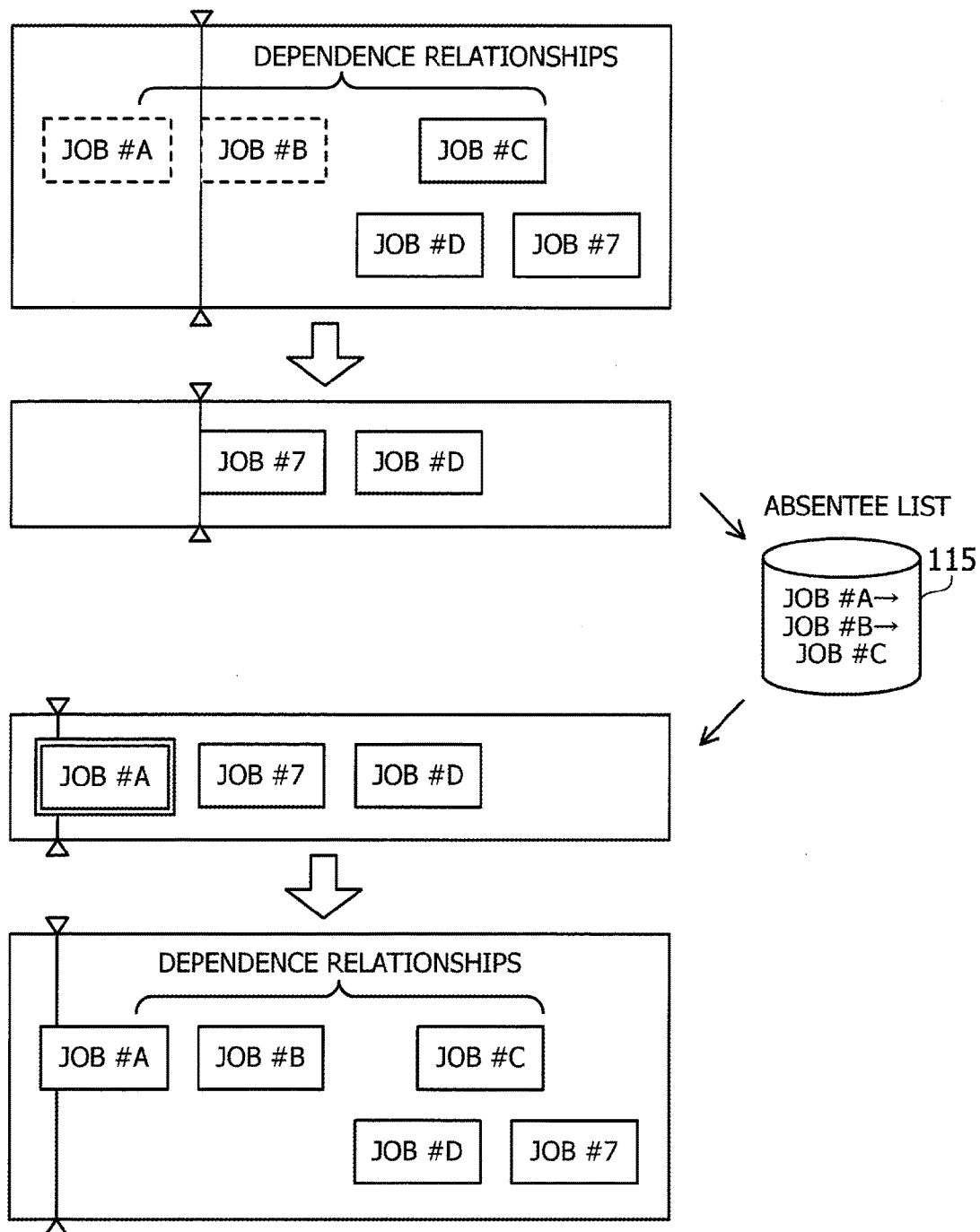
FIG. 24 illustrates an example of rescheduling performed when an expected virtual job does not start.

FIG. 24 illustrates an example of rescheduling jobs when an expected virtual job does not start. When it is found that a specific virtual job does not start today, the scheduling unit 134 searches the past records of job execution, indicated by resource information stored in the resource information table 111, and finds dependent virtual jobs that usually follow the virtual job in question (referred to as the "reference virtual job"). More specifically, the scheduling unit 134 seeks virtual jobs that meet all the following three conditions.

Condition #1: Match with the reference virtual job in terms of both the execution dates and no-execution dates. (This means that the past records suggest that the reference virtual job and these virtual jobs execute on the same dates and are absent on the same dates.)

Condition #2: Never precede the reference.

Condition #3: Have a nearly constant time difference from the reference virtual job. (For example, the variations or variance of their difference in the execution start time is below a certain threshold.)

In connection with the condition #3, the scheduling unit 134 may be configured to check the total CPU usage on a particular day when the virtual jobs appear to have an unusually large difference in their execution start times on that day. The scheduling unit 134 may reject such extreme values when testing condition #3 as being inappropriate because they could be caused by a shortage of CPU resources.

The scheduling unit 134 is further programmed to reschedule the jobs of today, assuming that the absence of those dependent virtual jobs which would usually follow the reference virtual job. This action of rescheduling takes place when both of the following two events are detected.

Event #1: Expiration of expected start time (i.e., the latest start time found in past execution records) of the reference virtual job, without seeing the job get started.

Event #2: Expiration of expected start time of the leading dependent virtual job that immediately follows the reference virtual job, without seeing the job get started.

In the original job schedule, there is a managed job that is to start far after the reference virtual job and its dependent virtual jobs noted above. During the course of its rescheduling processing, the scheduling unit 134 shifts this managed job forward.

Referring to FIG. 24, the scheduling unit 134 initially schedules its managed job #7, assuming that virtual jobs #A, #B, #C, and #D are also executed today. The job schedule thus arranges four virtual jobs #A to #D and one managed job #7 in the illustrated order, where two virtual jobs #B and #C are dependent on virtual job #A. The scheduling unit 134 knows that virtual job #B starts before virtual job #C.

Contrary to the original job schedule described above, the first virtual job #A does not appear, and virtual job #B is also not seen in its expected place even after the scheduled start time has passed. At this point in time, the scheduling unit 134 finds that all the expected virtual jobs #A, #B, and #C are canceled today. The scheduling unit 134 now reschedules remaining jobs #D and #7, with the assumption that dependent virtual jobs #B, and #C are both absent (which means that there emerges a large space for relocation of jobs). As a result of this rescheduling, managed job #7 is allowed to start earlier than its original execution start time.

While not executed today, the above-noted virtual jobs may come back together next day or some other day, ignoring their usual execution cycles. In preparation for them, the scheduling unit 134 produces an absentee list 115 to register the above reference virtual job and its dependent virtual jobs as a set of records. This absentee list 115 is stored as part of the schedule database 110.

Records in the absentee list 115 help the scheduling unit 134 recall foreign jobs that were not executed the other day.

More specifically, the scheduling unit 134 consults the absentee list 115 when it sees an unexpected foreign job get started. If the name of that foreign job is found in the absentee list 115, the scheduling unit 134 uses its associated records to identify other foreign jobs that are likely to follow the currently running foreign job. These jobs are registered as virtual jobs, and the scheduling unit 134 considers them in the subsequent rescheduling process. For example, the scheduling unit 134 may have to delay a managed job in the new job schedule because the above-identified dependent virtual jobs have been inserted after the currently running job.

Referring again to FIG. 24, the absentee list 115 contains a set of records indicating virtual jobs #A, #B, and #C. The job schedule of today includes no entry of a foreign job corresponding to virtual job #A. Contrary to the schedule, the scheduling unit 134 encounters unexpected virtual job #A in the first place as indicated by the double-line frame in FIG. 24. Here the absentee list 115 permits the scheduling unit 134 to predict that two virtual jobs #B and #C are to follow the virtual job #A, and the scheduling unit 134 reschedules the jobs, including all those foreign jobs (or virtual jobs) as part of today's jobs. As seen in the lower half of FIG. 24, the scheduling unit 134 gives some delay to managed job #7 to avoid conflict.

The scheduling unit 134 in the above example relies on the absentee list 115 to identify a reference virtual job and its dependent virtual jobs. When an unexpected foreign job is started, the scheduling unit 134 retrieves its associated foreign jobs from the absentee list 115 and reschedules the jobs including the retrieved foreign jobs as additional virtual jobs to be executed today. As additional features, the scheduling unit 134 may deal with foreign jobs not registered in the absentee list 115. That is, when a non-registered foreign job gets started unexpectedly, the scheduling unit 134 searches past execution records for its dependent foreign jobs and reschedules the jobs including the retrieved foreign jobs as additional virtual jobs to be executed today.

According to the second embodiment discussed above, the proposed information processing system offers a scheduler 130 configured to coordinate its own managed jobs in consideration with foreign jobs whose scheduling is not in the scope of the scheduler 130 itself. The proposed scheduler design enables the system to avoid unintended delay of jobs, which could otherwise be caused by a conflict between managed jobs and foreign jobs in their CPU resource usage and file access. The scheduler 130 also has the function of visualizing foreign jobs that are extracted and registered as virtual jobs. This function permits the user to review and fine-tune the job schedule.

In the stage of scheduling, the scheduler 130 extracts foreign jobs that could affect execution of managed jobs. Since it focuses on the scheduled execution time period of managed jobs, rather than trying to cover all such jobs, this extraction work puts less burden on the scheduler 130. The scheduler 130 may then modify the start time of managed jobs within a limited range, based on their dependence relationships predicted from the past execution records. This feature of dependence-based rescheduling permits the scheduler 130 to preserve the coherence of job streams, without the need for the user to explicitly specify such relationships.

In the stage of execution, the scheduler 130 may stop some managed job or foreign job forcibly and roll back modified files by using backup files, thus maintaining the coherence between the execution result of such jobs and the final content of accessed files. The scheduler 130 may also encounter unexpected starting of a foreign job or unexpected absence of a foreign job, contrary to the job schedule. When this happens, the scheduler 130 consults the past records of job execution to estimate foreign jobs that may follow, and then reschedules the jobs including those estimated foreign jobs. This feature makes it possible to take quick measures against such unpredicted behavior of foreign jobs, thus contributing to efficient use of CPU resources and avoidance of unintended delay of jobs.

The foregoing processing functions of the first embodiment may be encoded into a program for execution on the controller apparatus 10. Similarly, the information processing functions of the second embodiment may be implemented as a program executed by the job management server 100.

These programs may be recorded on a non-transitory computer-readable medium (e.g., storage medium 33) such as a magnetic disk, optical disc, magneto-optical disc, and semiconductor memory device. Magnetic disk media include FD and HDD. Optical disc media include CD, CD-Recordable (CD-R), CD-Rewritable (CD-RW), DVD, DVD-R, DVD-RW, and their kin. Portable storage media may be used to distribute programs. The programs stored in a portable storage medium are copied (installed) to local storage devices (e.g., HDD 103) before they are executed by a processor.

Two embodiments and their possible variations have been discussed above. In an aspect of these embodiments, the proposed techniques reduce the computational load of job scheduling.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable medium storing a program that causes a computer to perform a process comprising:

referring to registered jobs in a scheduler for execution on an information processing apparatus, wherein the registered jobs are to be invoked by the scheduler;

obtaining job history information including execution records of one or more other jobs not registered in the scheduler, wherein the other jobs are to be executed without being invoked by the scheduler;

estimating, based on the obtained job history information, resource usage during an execution time period scheduled for each of the registered jobs, while limiting estimation of other resource usage during time periods other than the scheduled execution time period, the resource usage including resource usage of at least one of the other jobs to be executed together with the registered jobs on the information processing apparatus; and scheduling jobs including the registered jobs and the at least one of the other jobs and shifting the execution time period scheduled for one of the registered jobs, when the estimated resource usage satisfies predetermined conditions;

estimating again resource usage in the shifted execution time period; and rescheduling the jobs according to the resource usage estimated for the shifted execution time period.

2. The non-transitory computer-readable medium according to claim 1, wherein the jobs scheduled by the scheduling further include another one of the other jobs that is related to the at least one of the other jobs.

3. The non-transitory computer-readable medium according to claim 2, wherein the process further comprises:

monitoring execution of the at least one of the other jobs; and rescheduling the jobs upon detection that the at least one of the other jobs is not executed, assuming that the related one of the other jobs is also not executed.

4. A non-transitory computer-readable medium storing a program that causes a computer to perform a process comprising:

referring to registered jobs in a scheduler for execution on an information processing apparatus;

obtaining job history information including execution records of one or more other jobs not registered in the scheduler;

estimating, based on the obtained job history information, resource usage during an execution time period scheduled for each of the registered jobs, the resource usage including resource usage of at least one of the other jobs to be executed together with the registered jobs on the information processing apparatus;

scheduling jobs including the registered jobs and the at least one of the other jobs and shifting the execution time period scheduled for one of the registered jobs, when the estimated resource usage satisfies predetermined conditions;

estimating again resource usage in the shifted execution time period; and rescheduling the jobs according to the resource usage estimated for the shifted execution time period.

5. The non-transitory computer-readable medium according to claim 1, wherein the process further comprises:

suspending the at least one of the other jobs upon detection that the at least one of the other jobs has started earlier than execution start time that the scheduling has determined for the same.

6. The non-transitory computer-readable medium according to claim 1, the predetermined conditions include at least one of:

that one of the registered jobs in the scheduler and the at least one of the other jobs are to make access to a particular file concurrently, and that a total load caused by execution of one of the registered jobs and the at least one of the other jobs is expected to exceed a threshold.

7. The non-transitory computer-readable medium according to claim 1, wherein the process further comprises:

outputting display data for visualizing scheduled execution of the registered jobs in the scheduler, as well as of the at least one of the other jobs.

8. A control method comprising:

referring to, by a processor, registered jobs in a scheduler for execution on an information processing apparatus, wherein the registered jobs are to be invoked by the scheduler;

obtaining, by the processor, job history information including execution records of one or more other jobs not registered in the scheduler, wherein the other jobs are to be executed without being invoked by the scheduler;

estimating, by the processor and based on the obtained job history information, resource usage during an execution time period scheduled for each of the registered jobs, while limiting estimation of other resource usage during time periods other than the scheduled execution time period, the resource usage including resource usage of at least one of the other jobs to be executed together with the registered jobs on the information processing apparatus; and scheduling, by the processor, jobs including the registered jobs and the at least one of the other jobs and shifting the execution time period scheduled for one of the registered jobs, when the estimated resource usage satisfies predetermined conditions;

estimating again resource usage in the shifted execution time period; and rescheduling the jobs according to the resource usage estimated for the shifted execution time period.

9. A controller apparatus comprising:

a memory configured to store job history information indicating execution records of one or more other jobs not registered in a scheduler, the other jobs being different from registered jobs in the scheduler, wherein the registered jobs are to be invoked by the scheduler and the other jobs are to be executed without being invoked by the scheduler; and a processor configured to perform a procedure including:

estimating, based on the job history information in the memory, resource usage during an execution time period scheduled for each of the registered jobs, while limiting estimation of other resource usage during time periods other than the scheduled execution time period, the resource usage including resource usage of at least one of the other jobs to be executed together with the registered jobs on an information processing apparatus; and scheduling jobs including the registered jobs and the at least one of the other jobs and shifting the execution time period scheduled for one of the registered jobs, when the estimated resource usage satisfies predetermined conditions;

estimating again resource usage in the shifted execution time period; and rescheduling the jobs according to the resource usage estimated for the shifted execution time period.

* * * * *